United States Patent [19]
Thayer et al.

[11] 3,981,758
[45] Sept. 21, 1976

[54] PROCESS CONTROL SYSTEM FOR CORRUGATORS

[75] Inventors: William Stansbury Thayer, Lutherville; Charles Edward Thomas, Reisterstown, both of Md.

[73] Assignee: Koppers Company, Inc., Pittsburgh, Pa.

[22] Filed: Nov. 4, 1974

[21] Appl. No.: 520,687

[52] U.S. Cl. .................................. 156/64; 156/351; 156/359; 156/378; 156/470

[51] Int. Cl.$^2$ .......................................... B32B 31/00

[58] Field of Search ............... 156/60, 64, 205–210, 156/470–473, 350, 351, 359, 378; 162/253, 252; 242/75.4; 235/151.13, 151.1; 34/41; 226/44

[56] References Cited

UNITED STATES PATENTS

| | | | |
|---|---|---|---|
| 2,941,573 | 6/1960 | Cassady | 156/60 |
| 2,951,007 | 10/1960 | Lippke | 162/253 X |
| 3,004,880 | 10/1961 | Lord | 156/64 |
| 3,075,700 | 1/1963 | Bishop | 235/151.1 X |
| 3,175,300 | 3/1965 | Nitchie | 156/60 X |
| 3,257,086 | 6/1966 | Drenning | 242/75.4 |
| 3,845,287 | 10/1974 | Fremont et al. | 235/151.1 |

*Primary Examiner*—David A. Simmons
*Attorney, Agent, or Firm*—Oscar B. Brumback

[57] ABSTRACT

A method and apparatus for improving overall quality and reducing warp in corrugated paperboard blanks by controlling a number of interrelated production factors in the production of a double-face corrugated paperboard web from which the blanks are made including the selection of product variables, production of the web, observation of warp characteristics, and adjustment of production factors affecting warp characteristics. Apparatus for controlling warp characteristics includes water sprays at various points along the production apparatus, tensioning devices for various lamina of the composite web, wrap devices for controlling heat supplied to the lamina, adhesive-gap control devices affecting moisture content of the lamina, pressure and flotation devices for controlling heat exposure time of the web, and feedback devices for automatically maintaining selected relationships between the production factors as a function of production speed.

54 Claims, 14 Drawing Figures

SEQUENCE OF OPERATION

MODE 1

| POSITION | ZONE 1 | ZONE 2 | ZONE 3 | ZONE 4 |
|---|---|---|---|---|
| 1 | 50 | 50 | 50 | 50 |
| 2 | 50 | 50 | 50 | A |
| 3 | 50 | 50 | A | A |
| 4 | 50 | A | A | A |
| 5 | UP | UP | UP | UP |

MODE 2

| POSITION | ZONE 1 | ZONE 2 | ZONE 3 | ZONE 4 |
|---|---|---|---|---|
| 1 | 100 | 100 | 100 | 100 |
| 2 | 100 | 100 | 100 | A |
| 3 | 100 | 100 | A | A |
| 4 | 100 | A | A | A |
| 5 | UP | UP | UP | UP |

100=100% ROLL WT. ACTING - AIR LIFT OFF - BELT LIFT DOWN
50=50% ROLL WT. ACTING - AIR LIFT OFF - BELT LIFT DOWN
A=0% ROLL WT. ACTING - AIR LIFT ACTING - BELT LIFT DOWN
UP=0% ROLL WT. ACTING - AIR LIFT OFF - BELT LIFT UP

PROCESS CONTROL SYSTEM FOR CORRUGATORS

BACKGROUND OF THE INVENTION

1. Field of the Invention:

This invention relates generally to plastic and non-metallic article shaping or treating processes and particularly to reshaping running or indefinite length work; specifically, the invention relates to improved methods and apparatus for producing double-face corrugated paperboard webs formed by laminating flat facing webs to opposite sides of a corrugated paper web.

2. Description of the Prior Art:

Corrugated paperboard is manufactured at high production rates on corrugator machines which are well known in the paper industry. A typical machine includes a corrugating and gluing section, a heating section, and a cooling section. In the first section, corrugations are formed transversely across an intermediate web and liquid adhesive is applied to the tips of the flutes of the corrugated web or medium. After the adhesive is applied, a first single-face liner web is brought into contact with the glue-coated flutes to form a laminated single-face web consisting of one liner and the corrugated medium. The single-face web is then advanced past a glue machine downstream to apply adhesive to the exposed flute tips of the medium and thereafter a second double-face liner web is applied to the exposed side of the corrugated medium. The combined double-face web consisting of a single face web and the second liner then passes through a heating section where the liquid adhesive holding the second liner to the corrugated medium is cured. The adhesive is cured by passing the freshly glued web across a series of hotplates under pressure from above. The hotplates are usually heated internally by steam to a temperature needed to cure the adhesive. The pressure is provided by moving the web over the hotplates under an endless ballast belt which rests upon the upper liner of the single-face web and advances together with the web at the same speed. Weight rollers on top of the lower flight of the belt provide additional pressure to hold the web lamina together and maintain them flat against the hotplates to enhance heat transfer from the hotplates to the web to cure the adhesive. As the heat acts upon the adhesive, it also drives moisture out of the combined web so that the finished corrugated paperboard web exists from the downstream end of the heating section in a stiff and substantially flat condition. The web then passes immediately through a cooling section to reduce its temperature prior to being divided into a plurality of webs of selected widths each of which is then cut transversely to form corrugated paperboard blanks.

One particular difficulty that has plagued the corrugated paperboard industry for many years is that the finished blanks tend to be warped in one or more directions which makes it difficult to form them into containers. This tendency has been attributed at various times to different production factors such as residual stresses, moisture variations, adhesive quantity, induced tension, and heat transfer characteristics. Many corrective methods and apparatus have been used with limited degrees of success.

It is helpful to understand that a warped blank is not flat; instead, it may be curled slightly upward or downward on both sides across the width of the machine (hereinafter called cross-machine direction or C-D warp); it may be curled slightly upward or downward on both ends in its direction of travel (hereinafter called machine-direction or M-D warp); it may be curled upward on one side and downward on the other across the width of the machine (hereinafter called S-warp); or diagonal corners of the blank may curl upward or downward in the same direction (hereinafter called twist-warp).

Much attention has been given to the application of heat to the combined web in the heating section to improve overall quality and reduce warp. Exemplary patents include: Cassady U.S. Pat. No. 2,941,573 showing movable hotplates to control heat transfer by selectively spacing the plates from the web; Moser et al U.S. Pat. No. 2,993,527 showing pressure-loaded rolls to maintain bonding pressure against the web; Moser et al U.S. Pat. No. 3,226,840 showing an air-film system to selectively reduce heat transfer; Shields U.S. Pat. No. 3,472,158 showing application of weight rollers to increase bonding pressure; Nitchie U.S. Pat. No. 3,175,300 showing another air-film system to selectively reduce heat transfer; Stewart U.S. Pat. No. 3,347,732 showing the application of air pressure to the top of the web to hold it against the hotplates; and Hayasi et al U.S. Pat. No. 3,829,338 showing a temperature feedback system for varying the effective weight of ballast rollers to control heat transfer.

Other factors are also known to influence the tendency of the blanks to warp. For example, moisture imbalances between the single-face and double-face liner are known to create internal stresses in the web which results in warp in the blanks made from the web. The initial addition of moisture is made in the form of steam to the corrugated medium supply web; suitable apparatus for applying steam is illustrated din Bruker U.S. Pat. No. 2,674,299 and Bruker et al U.S. Pat. No. 2,718,712. In addition, water vapor may be applied to the double-face liner such as shown in Gebbie U.S. Pat. No. 2,987,105 and, for that matter, in a similar manner to the single-face web.

Another factor contributing to the moisture content of the various lamina is the adhesive to bond the lamina together. The adhesive commonly used is an ungelatinized granular starch in a liquid carrier that is cured by gelatinization and dehydration which result from the application of heat. Apparatus commonly used for applying the adhesive to the tips of the exposed flutes of the single-face web is shown in Thorn U.S. Pat. No. 2,827,873; similar apparatus is also used to apply the adhesive to the flute tips of the corrugated medium just prior to joining the medium to the single-face liner.

Still another factor influencing warp is the amount of heat applied to the various lamina beforoe they are joined as well as heat applied to the single-face web and double-face liner before these are joined. The application of moisture and heat is normally referred to as preconditioning and results in dimensional changes in the lamina. The application of moisture may be made with the apparatus mentioned above; heat may be applied by warping the webs around a large heated drum. The amount of heat applied at a given speed can be controlled by varying the distance that the web is warped around the drum. Examples are shown in Bruker U.S. Pat. No. 2,710,045 and Sherman U.S. Pat. No. 3,218,219.

One final factor that affects warp, especially M-D warp in the direction of web travel is the tension applied to both the single-face web and the double-face liner prior to their being adhesively joined. Such tension may be applied to the single-face web by, for example, a vacuum device such as shown in Shield's U.S. Pat. No. 3,438,449 or a vacuum device such as shown in Middleman U.S. Pat. No. 3,788,515. Tension may be applied to the double-face liner by a device such as shown in Drenning U.S. Pat. No. 3,257,086 or even by a dancer roll pressed against the liner such as shown in Sherman U.S. Pat. No. 3,218,219 or in any similar manner.

In the past, the moisture content in the various lamina, the amount of adhesive applied to the flutes of the medium, the amount of heat applied to the lamina and the amount applied to cure the adhesive, and the tension applied to the single-face web and double-face liner have been individually and manually controlled according to the skills of the production operator. But, even with a high degree of skill, it is almost impossible for an operator to adjust all the variables to the extent necessary to consistently produce warp-free blanks, particularly since the variables are interrelated such that adjustment of one variable may often nullify or at least seriously affect the adjustment of another variable. In addition, the adjustment of most of the variables is dependent on the speed of production and, to further complicate matters, the dependecy is not directly linear.

The result of incorrect adjustment or failure to adjust certain variables usually results in the production of inferior blanks and often a great deal of scrap corrugated web, particularly the web produced in the interim between adjustments required because of changes in production speed, such speed often being changed because of the nature of production of corrugated paperboard webs and blanks.

Now, after considerable study and testing, it has been found that no single production factor can exclusively control warp occuring in the finished blanks. Rather, it is a combination of factors which, when controlled in accordance with this invention, results in warp-free blanks or at least results in a considerable reduction of warp.

The method of this invention may be performed with substantially conventional apparatus modified to the extent necessary to provide for adjustment by the control system of the present invention. However, operation is improved by the use of apparatus improved to include additional functions and capabilities as will be hereinafter described.

SUMMARY OF THE INVENTION

Accordingly, an object of the present invention is generally to improve the quality of corrugated paperboard blanks made from webs produced at high production rates and particularly to reduce the warp usually present in such blanks, and to do so consistently and substantially automatically regardless of the web production speed.

A corrugator is a non-symmetrical process machine. In accordance with this invention, heat, moisture, tension, and time are the controlled parameters used to achieve conditions in the single-face web and double-face liner that results in equilibrium in the combined double-face web, such equilibrium resulting in the production of warp-free blanks of good overall quality. Simply stated, by this invention, heat, moisture, tension, and time are automatically maintained constants that produce equilibrium; the proper relationship of these constants is achieved by manual operator input after which the relationship is maintained constant by automatic input of the corrugator speed. The constants are physically produced by machine elements that respond to a manual change in the constant values by the operator and that respond to a change in machine speed to automatically maintain such values at the selected production speed.

Briefly, the control of production factors is accomplished first by selecting the production variables such as the paper stock. Flute height, adhesive quantity, machine speed, and the like in accordance with conventional requirements of the web and blanks to be produced, running the machine to begin production of the web, observing the overall quality of the finished blanks and particularly the type and degree of warp present in the blanks. Then, the control system of the invention is used to automatically, in response to operator inputs of symptoms of overall quality, adjust within the machine the time that the combined web is exposed to heat in the heating section; adjust the bonding pressure to which the web is subjected in the heating section; adjust the amount of adhesive applied to the flutes of the corrugated medium; and then, to reduce warp present in the blanks: adjust the tension in either the single-face web or double-face liner entering the heating section to reduce warp in the machine direction; adjust the amount of and location to which moisture is added to both the single-face web and double-face liner to reduce C-D or S-warp in the cross-machine direction; and adjust the amount of heat applied to the various lamina to reduce C-D warp and improve overall quality and thereafter maintain the selected relationships at all production speeds of the corrugator.

At this point, it should be recognized that the system comprises more than the remote control of individual pieces of equipment in the system. For example, a control console is provided that includes selectors for: starting and stopping the double-facer portion of the machine; when necessary, overriding a local control for selecting the thickness of the adhesive film to be applied to the flutes of the corrugated medium; selecting an operating mode as a function of flute size; selecting ranges of weight roll pressure as a function of paper weight and web width; and selectors for correcting C-D warp, M-D warp, and S-warp. The console also includes various speed indicators and the like; however, it does not permit the operator to directly adjust the settings or control the operation of individual pieces of equipment; instead the selectors on the console are used by the operator to manually feed into the system the symptoms of poor quality such as warp. The system is programmed to respond to these symptoms and make the needed corrections and adjustments automatically without further operator input. Some of the selectors are operated in increments corresponding to the degree of undesirable product characteristics observed by the operator and the machine responds automatically to provide a corresponding incremental correction. In addition, and very importantly, the machine maintains a preprogrammed relationship between the controlled variables following changes in production speed.

For example, in response to a selector input indicating C-D warp in the final product, one or more control factors might be changed, depending on the amount of warp indicated by the selector input, to correct the warp; such control factors including a change in the effective length of the heating section (determined by the number of active ballast rolls and operations of a web flotation system) to control the time that heat is applied to the lamina, including a change in preheater web wrap at one of three locations to control the amount of heat applied to the lamina, including adjustment of water sprays to control the amount of moisture applied to the lamina, and, in instances of extreme warp, the adjustment of the thickness of the adhesive applied to the corrugated medium flute tips to control both moisture content and overall quality of the final blanks.

Similarly, a selector input indicating M-D warp would result in a change in relative tension between the single-face web and the double-face liner prior to their entering the heating section.

In similar fashion, a selector input indicating S-warp would result in water sprays being applied to selected portions of the web across the width of the machine at a number of locations to balance the moisture content of the web from which the blanks are made.

For twist-warp, the selectors for both C-D and M-d warp are used in combination to correct the deficiency with the controlled variables responding as mentioned above.

In addition, the controlled variables respond automatically to changes in production speed so that no further inputs need be made by the operator.

Several advantages are achieved by following the methods of the invention, the most important ones being effective warp control, high reliability, control simplicity, centralized control, and increased production.

The above and further objects and novel features of the invention will appear more fully from the following detailed description when the same is read in connection with the accompanying drawings. It is to be expressly understood, however, that the drawings are not intended as a definition of the invention but are for the purpose of illustration only.

BRIEF DESCRIPTION OF THE DRAWINGS

In the drawings wherein like parts are marked alike.

DESCRIPTION OF THE PREFERRED EMBODIMENT

Figure 1:
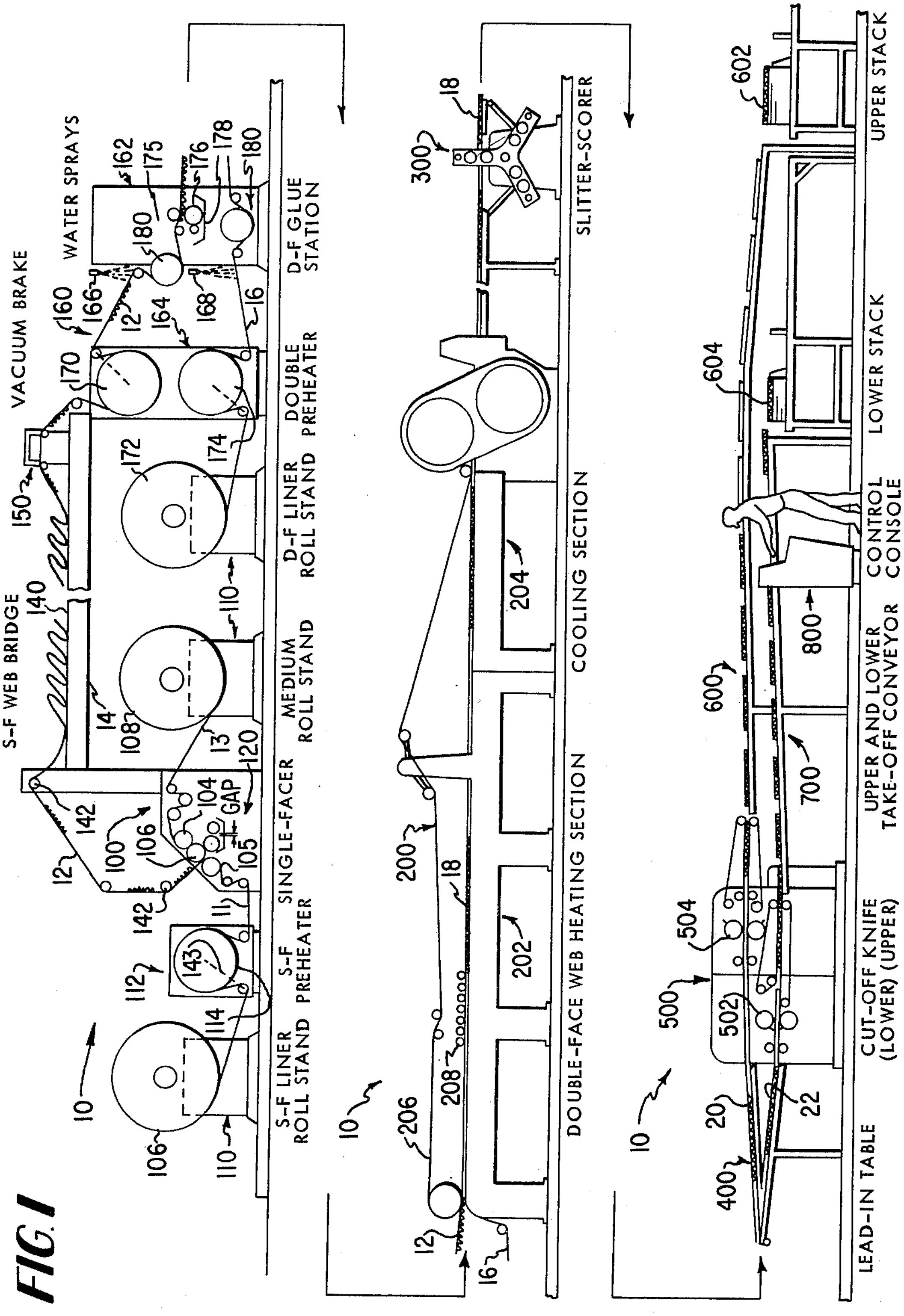
FIG. 1 is a schematic illustration in side elevation of a corrugator machine adapted for operation in accordance with the invention.

For a full understanding of the method of this invention, it is better to first understand the construction and operation of the machines that are used. FIG. 1 schematically illustrates in side elevation a complete corrugator generally denoted by numeral 10 on which the main elements are labeled to simplify explanation. The construction and operation of the corrugator will be explained first after which each main element will be explained. For convenience, sub-headings for the main elements are included along with a patent reference to illustrate typical prior art machines. These patents are incorporated herein by reference to the extent that they are needed for a full understanding of the invention and to reduce the length of this specification. However, the machines referred to are modified to the extent needed for the present invention.

Corrugated paperboard blanks are made from an advancing continuous web of double-face corrugated paperboard by first dividing the width of the web into plural webs of selected widths and thereafter cutting lengths of the plural webs into selected lengths to provide the blanks of desired sizes. The process of making such blanks is well known in the art, but for a full understanding of the invention, it will be briefly described as follows.

First, a single-face web is made to which is joined a double-face liner resulting in a double-face web from which the blanks are cut. The single-face web consists of a corrugated medium to which a flat single-face liner is glued by applying glue to the flute tips of the corrugated medium. The double-face web consists of the single-face web to which a flat double-face liner is glued by applying glue to the exposed flute tips of the corrugated medium of the single-face web.

Referring to FIG. 1, the single-face web 12 (hereinafter S-F web) is formed by the single-facer generally denoted by numeral 100. From single-facer 100 the web 12 advances along a bridge 14 to where it enters the double-facer 200 with the exposed flutes of the medium facing down. The double-face liner 16 (hereinafter D-F liner) is brought into contact with the S-F web 12 so they enter the double-facer 200 together and in which they are permanently joined to form a double-face web 18 (hereinafter D-F web).

The D-F web advances to a triplex slitter-scorer 300 (hereinafter slitter) where it is divided into two or more D-F webs 20 and 22 of selected width, each of which is scored with a pair of parallel score lines to form fold lines needed in the blanks from which containers are made.

The webs 20 and 22 are advanced from the slitter 300 over a lead-in table 400 to a rotary cut-off knife generally denoted by numeral 500. Knife 500 includes a lower knife 502 and an upper knife 504 to which the webs 20 and 22 are directed by the lead-in table 400. Each knife cuts its respective web into the selected blank length, the length of the blanks from one web usually being different from the other.

The blanks advance along upper and lower conveyors 600 and 700 to where they are piled in stacks 602 and 604. Thereafter, the blanks are automatically or manually removed to a storage area (not shown). The single-facer section 100: (U.S. Pat. Ref. No. 3,390,040)

A full explanation of the construction and operation of a typical single-facer may be found in the patent reference. Briefly, however, the single-facer 100 includes a pair of meshing, fluted corrugating rolls 104 and 106. Paper stock from a supply roll 108 of selected width mounted for unwinding on a conventional roll-stand 110 from which the corrugated medium 13 is formed passes first over a conventional steam shower (not shown - see U.S. Pat. No. 2,718,712) which adds moisture and heat to the medium, and then between the corrugating rolls 104 and 106 which corrugates the medium. Immediately after being corrugated, the flute tips of the medium are coated with conventional starch adhesive. Simultaneously, the S-F liner 11 is brought into contact with the coated flute tips and both the medium and S-F liner passes between a heated pressure roll 105 and the lower corrugating roll 106 which heats the glue to its gelatinization point, driving out a portion of the carrier liquid and forming a green bond (uncured) joining the medium 13 and S-F liner 11 to form S-F web 12. S-F web 12 is advanced by conventional conveyors to bridge 14 where it continues to cure while it advances in folds along a bridge platform in the usual manner.

The single-facer section includes a supply roll 108 for the medium web 13 and a supply roll 106 for the S-F liner web 11. When the paper is nearly exhausted in the foll being used, paper from a second roll (not shown) is spliced onto the exhausted roll to form a continuous supply in the conventional manner. Splicing may be done manually but preferably automatically such as shown in Butler U.S. Pat. No. 3,753,833.

The S-F liner 11 from roll 106 is passed around a drum 114 in the preheater 112 between the supply roll 106 and single-facer 100 which applies heat to the S-F liner. The amount of heat applied is varied in accordance with this invention and will be subsequently explained in greater detail. In addition, the thickness of the glue film (indicated as "gap" in FIG. 1) may also be controlled in certain instances as will be explained.

The roll-stands 110 also include a breaking device such as illustrated in U.S. Pat. No. 3,488,014 or 3,257,086 which maintains the medium web 13 and S-F liner 11 in tension between the supply rolls and the single-facer as the rolls unwind. The bridge section 14: (U.S. Pat. No. Ref. 2,710,045)

The bridge section includes a platform 140 along which the S-F web 12 advances to the double facer 200. The platform passes over the supply roll-stand 110 for the single-facer and similar roll stand for the D-F liner supply roll. The bridge 14 supports the rollers 142 which advance the S-F web 12 to the platform 140. The glue joining the medium 13 and S-F liner 11 cures into a firm bond as the S-F web 12 traverses the bridge. The single-facer 100 may run, for a short time, faster than the double-facer 200 to provide storage of the linearly flexible S-F web on the bridge in folds as shown. This permits the double-facer 200 to continue operating when the single-facer 100 is slowed down for splicing of the supply rolls.

However, if desired, the speeds of the single-facer 100 and double-facer 200 may be synchronized to avoid having S-F web produced at one production speed from being combined with a D-F liner at a different production speed. The advantage of synchronization is that the desired tension, moisture, heat, and heating time constants may be more easily maintained since some constants relate to the S-F liner and S-F web whereas others relate to the D-F web.

If speed synchronization is used, it is helpful to understand that it is desirable to run the double-facer at a constant preselected speed to maintain control of the product. Thus, if the single-facer is to be slowed down, for example, to make a splice in supply roll 106, it would first be speeded up to provide additional S-F web storage on bridge 14 to permit the double-facer to continue running during the single-facer slow down. However, if for some reason the double-facer 200 must be slowed down, the single-facer 100 would simultaneously be slowed down to keep storage of S-F web 12 on bridge 14 at a minimum. In this manner, it is possible to make D-F web at about the same speed that the S-F web was produced.

A S-F web vacuum brake 150 is supported at the downstream end of bridge 14. A full explanation of the construction and operation of brake 150 may be found in U.S. Pat. No. 3,788,515. Briefly, the brake includes a vacuum chamber above the web 12 that applies vacuum to the S-F liner 11 of the S-F web 12 and induces tension in the S-F web between the brake 150 and the double-facer 200. This tension is varied in accordance with this invention as will be subsequently described in greater detail. In addition, brake 150 includes suitable side guides (not shown) for maintaining lateral alignment of the S-F web 12 as it advances to the double-facer 200. The double-facer supply section 160: (U.S. Pat. No. Ref. Glue Station 2,827,873; preheater U.S. Pat. No. 3,218,219)

The double-facer supply section 160 includes a glue station 162, a double preheater station 164, a roll-stand 110, and water spray assemblies 166 and 168 for both the S-F web 12 and D-F liner 16. The S-F web advances from the vacuum brake 150 around an upper drum 170 in the preheater 164, past the glue station 162 and into the double-facer station 200. The D-F liner 16 is advanced from a supply roll 172 around a lower drum 174 in preheater 164 and into the double-facer section 200. The water spray assembly 166 applies moisture to the S-F web 12 and the water spray assembly 168 applies moisture to the D-F liner 16 in controlled amounts, when needed, in accordance with this invention as will be subsequently explained in greater detail.

In addition, the glue station 162 includes two small preheater rolls 180 (with suitable guide rollers) over which the wetted sides of the S-F web 12 and D-F liner 16 pass before entering the double-facer 200. The purpose of these two preheater rolls 180 is to precondition the webs by evenly dispersing and driving in the moisture applied to the webs by the water sprays 166 and 168.

The roll-stand 110 for supply roll 172 holds the supply of paper stock for the D-F liner 16. The roll stand is constructed and operates in the same manner as the one described for the S-F liner; supply roll 172 may be spliced in the same manner; and the roll stand includes a similar brake for applying tension to the D-F liner extending between the roll stand 110 and double-facer 200.

The preheater 164 applies heat to both the S-F web 12 and D-F liner 16 before they enter the double-facer 200. The amount of heat may be selectively applied to both in accordance with this invention as will be subsequently explained in greater detail.

A full explanation of the construction and operation of the glue station 162 may be found in the patent reference. Briefly, it includes guide rolls 175 for guiding the S-F web 12 into contact with a glue applicator roll 176 which applies adhesive from pan 178 to the exposed flute tips of the S-F web. The film thickness of the glue applied by the glue roll 176 is set in accordance with usual practice, no additional control being required by the present invention. The double-facer section 200: (U.S. Pat. No. Ref. 3,676,264)

A full explanation of the construction and operation of a typical double-facer may be found in the patent reference which illustrates both a heating and cooling (also called "pulling") section. However, its construction and operation must be modified in accordance with this invention as will be subsequently explained in greater detail. Briefly, the double-facer section 200 includes a heating section 202 and a cooling section 204. The heating section 202 includes a plurality of serially aligned steam-heated hotplates (not shown in FIG. 1) over which the S-F web 12 and D-F liner 16 are pressed and advanced by a ballast belt 206 to form the D-F web 18. A number of ballast rollers 208 apply additional weight on the D-F web and, in conjunction with the heated plates, heats the glue to its gelatinization temperature and continues to heat the web to drive out the moisture to fully cure the glue.

The cooling section 204 includes a plurality of unheated rolls (not shown in FIG. 1) over which the D-F web 18 is drawn by the ballast belt 206. The cooling section 204 includes a lower belt passing over the cooling rolls (not shown in FIG. 1); the D-F web is sandwiched between this belt and the upper belt 206 to pull the web 18 through the heating and cooling sections and push it through the machines following the cooling section. Besides pulling the D-F web, the cooling section 204 dissipates heat from the web and cools the glue thereby completing the bonding process to form a D-F web of stiff double-face corrugated paperboard.

The slitting section 300: (U.S. Pat. No. Ref. 3,587,374)

The lead-in table section 400: (U.S. Pat. No. Ref. 3,575,331)

The cut-off knife section 500: (U.S. Pat. No. Ref: 2,879,845)

The take-off section 600 and 700: (U.S. Pat. No. Ref. 3,481,598)

These sections follow the double-facer 200 and, as previously explained, divide (slit) and score the web, cut the divided webs into the desired lengths of blanks, and stack the blanks into piles. A full explanation of the construction and operation of these sections may be found in the corresponding patent references. Since no modification to these sections is needed by this invention, no further explanation is believed necessary. It should be noted, however, that the control console 800 of the invention is preferably located near the stacks of blanks so that the operator can observe their overall quality and any deficient characteristics and thereafter utilize the controls of the invention to make corrections in the process.

The invention:

As previously mentioned in discussion of the prior art, it has been found that no single production factor is solely responsible for warp in the finished blanks; instead, it is a combination of such factors that results in warp and other deficiencies. And, it has been discovered that by controlling such factors in accordance with this invention, substantially warp-free blanks of good overall quality can be produced at high production rates.

In particular, it has been found that equilibrium of stresses and dimensional changes in the double-face web can be achieved by controlling the amount of heat, moisture, and tension applied to the various lamina and by controlling the time that each is applied. Thereafter, maintaining the selected relationships constant in relation to machine speed results in the continuous production of high quality, warp-free blanks.

The factors or constants most affecting the quality of the blanks can be generally categorized as time, heat, moisture, and tension. However, it should be immediately recognized that the basic nature of the production process requires the addition of heat, moisture, and tension of various amounts and at various locations to various lamina during the production process. But, it has now been found that by controlling the effects of time, heat, moisture, and tension on the lamina, high quality warp-free blanks can be produced; it is to this end that the present invention is directed.

First, it is helpful to understand where heat, moisture, and tension are conventionally applied, the times for which they are applied, and where modification of such applications and times is provided by this invention.

Referring to FIG. 1, the temperature and moisture content of the supply roll 106 for the single-facer 100 will vary depending on manufacturing variables in the paper mill. No attempt is made to control these variables by the present invention. Next, the steam shower (not shown in FIG. 1) applies heat and moisture to the medium supply web 13 to make it pliable for corrugating. This is done in accordance with usual practice, no modification being contemplated by this invention.

However, it has been found that the heat in the S-F liner 11 has a direct bearing on the quality of the final product. It is believed that residual stresses are created in the medium 13 and S-F liner 11 during the corrugating process and when they are joined, difference in dimensional growth causes one web to try to move relative to the other. However, the glue joints prevent relative sliding movement thereby resulting in warp in the S-F web 12. Therefore, the heat applied by the preheater 112 to the S-F liner 11 is controllable in accordance with this invention as will be later explained.

Moisture and heat are also applied to the corrugated medium 12 and S-F liner 11 in the single-facer itself as required by the process. First, the adhesive is contained in a liquid carrier, usually water, which is adsorbed first in the medium 13 and then in the S-F liner 11 as they are joined to form S-F web 12. Heat is applied to both by the heated corrugating roll 106 and pressure roll 105 as the medium and S-F liner are glued together, only a fraction of the moisture being driven out during bonding and some dissipating during storage of the S-F web 12 on the bridge 14. Thus, in extreme situations, the thickness of the glue film applied to the corrugated medium 13 is controlled in accordance with this invention.

Heat and tension are usually applied to the S-F web 12 and D-F liner 16 entering the double-facer 200. However, it is extremely important to control the amount of heat, tension, and moisture in these lamina so that the application of heat and time of heating in the double-facer may be more easily controlled. Thus, the tension applied to the S-F web 12 by the vacuum brake 150 is controlled and, in addition, heat is applied to it by the upper drum 170 of preheater 164.

Tension in the D-F liner 16 is controlled by a brake on the D-F liner roll stand 110, similar to that for the S-F liner, and heat is applied in controlled amounts by the lower drum 174 of preheater 164 similar to that for the S-F liner 11. In addition, moisture is applied, when needed, to the D-F liner 16 by the water spray assembly 168. It should be noted that water sprays are not included at this location on conventional machines.

A water spray assembly 166 is also provided to add moisture to the S-F web 12 when needed.

Tension on the combined S-F web 12 and D-F liner 16 forming the D-F web 18 is maintained in the double-facer 200 by the pull exerted by the belt 206 in the cooling section 104 and the drag created by the vacuum brake 150 on the S-F web 12 and by the brake on the D-F liner roll stand 110. Aside from this relationship, the most important factor affecting warp is the time that heat is applied in the heating section 202 of the double-facer 200, the effect of the cooling section being negligible since all plies of the D-F web 18 are cooled substantially equally.

The maximum amount of heat is applied when the D-F web 18 lies against all of the hotplates (not shown in FIG. 1) with the full weight of the ballast rollers 208 on the ballast belt 206 with the double-facer machine 200 running slowly. It can be seen that as the web speed is increased, less heat can be adsorbed by the web since it is in contact with the hotplates for a shorter time. Thus, one of the earliest approaches to controlling heat transfer was to speed up and slow down the web speed. Many corrugators are still operated in this manner although attempts have been made to control the heat transfer such as by tilting the hotplates, lifting some of the ballast rollers, and applying high pressure air to beneath the web. At this point, it should be recognized that it is extremely difficult to change the temperature of the hotplates themselves because they are steam heated and massive and change temperature very slowly which is not satisfactory for rapid heat control. It should be understood that rapid heat control is needed to avoid producing a great deal of unsatisfactory product which can easily occur at production speeds of up to 650 F.P.M.; in addition, it is needed when changing order sizes such as from light to heavy webs or narrow to wide webs. Other means, such as electrical heating, are expensive and impractical for corrugator use. Therefore, the basic elements of the conventional heating section have been modified to the extent necessary to achieve the degree of heat control desired.

In essence, the present invention is used to automatically control the factors affecting overall quality of the finished product and particularly, warp in the final blanks. The invention is best understood by reference to the operators control panel on control console 800. However, it should first be understood that certain variables must be taken into account in making settings and entering remedial corrections on the control panel. For example, certain product and machine operating variables must be selected at the beginning of each order although not all will be selected at the control console 800. For example, the paper stock, flute size, S-F speed, D-F speed, S-F glue gap, and D-F glue gap are selected by local controls near the appropriate machines whereas certain production factors such as pressure mode and M-D and C-D warp control positions are selected at the control console 800. Once the order is begun, the operator has two areas of control, one being local controls used to set roll pressures, etc. that are well known in the art to assure proper adhesion of the lamina and the like, the other being at the control console to control C-D, M-D and S-warp, the latter controls generally affecting the tension, moisture, heat, and heating time for the S-F web and D-F liner making up the D-F web although these factors are interrelated and the operator does not have direct control over the responsive machine elements.

An important novel feature of the invention is that the time that the D-F web 18 is exposed to heat in the heating section 202 is automatically selected as a function of a warp control selector position. First, the minimum amount of heat needed to gelatinize and then cure the adhesive to a sufficiently strong green bond was determined by testing. Then, the time required for this amount of heat to be applied to the glue line joining the S-F web flute to a light weight D-F liner was determined. It was found that the minimum time could be provided by two conventional hotplates about 24 inches long in the machine direction at a minimum operating speed of about 100 F.P.M. From this minimum exposure time, longer times for heating heavier and/or wetter liners are obtained by bringing the D-F web 18 automatically into contact with additional hotplates by use of weight roll lift and web floatation systems. As the speed of the D-F web is increased, to as much as 650 F.P.M., the exposure time, so selected by the warp control selector, is held constant by automatically bringing the D-F web into contact with additional hotplates. The control console 800 is wired to provide preprogrammed logic to automatically control the exposure time as a function of web speed as just explained.

Figure 6:
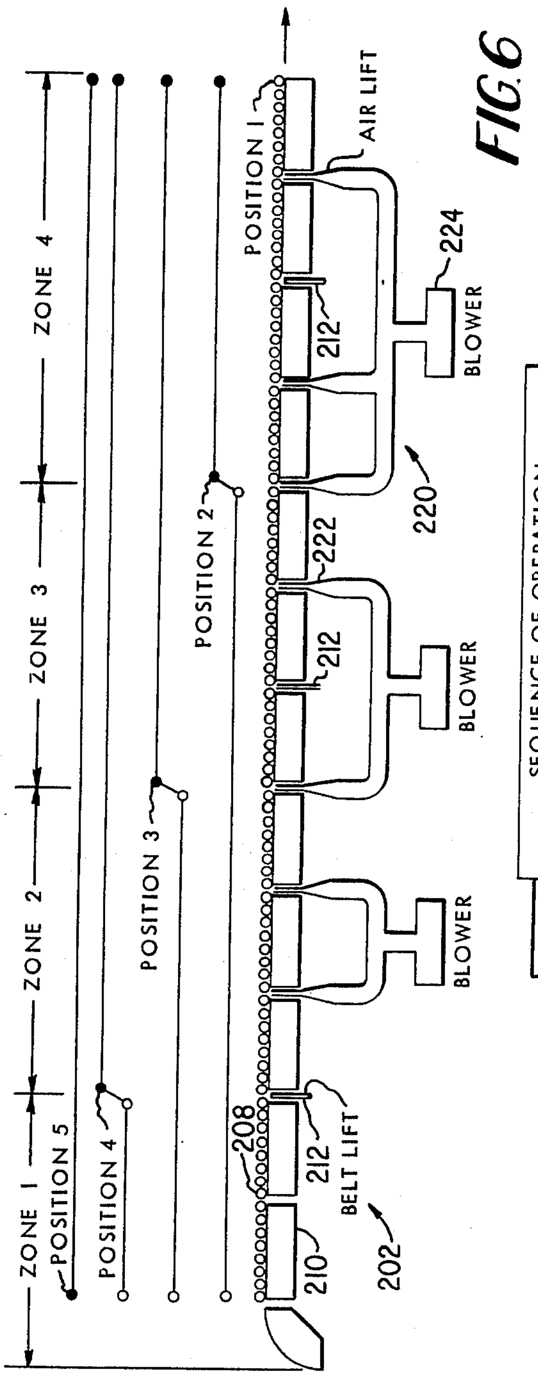
FIG. 6 is a schematic illustration of the double-face web heating section of FIG. 1 showing hotplate heating zones, weight roll system, air flotation system, lift bar system, and operating mode chart.

It has also been determined that a section including several hotplates rather than a single hotplate can be brought into contact with the advancing D-F web, in response to speed changes, so that the effective heating time can be increased in larger steps than by smaller steps provided by a single hotplate. Since the amount of heat applied by a single hotplate varies as a function of the temperature difference between the hotplate and the D-F liner surface, and since this temperature difference diminishes as the D-F web advances along the hotplates, the number of hotplates per section should increase along the path of advance from the entrance of the heating section 202. For example, a satisfactory arrangement for a heating section having 12 hotplates of 24 inch length would include a first section or zone having two hotplates, a second and third section having three hotplates each, and a fourth section having four hotplates. This arrangement is illustrated in FIG. 6. Similarly, for a heating section having 16 hotplates, the zones would be arranged to include, from the entrance, two, three, four, and seven hotplates (not illustrated).

Contrary to generally prevailing belief, it has been discovered that the weight rollers 208 pressing the belt 206 against the D-F web 18 to press the D-F web against the hotplates are not especially effective for controlling heat transfer from the hotplates to the D-F web 18. Instead, their value lies in maintaining the D-F web 18 flat against the hotplates and in keeping the S-F web 12 and D-F liner 16 together until the adhesive is sufficiently cured to hold these lamina together. Thus, the best operating position is with the full weight of the active weight rollers being applied against D-F web 18 through belt 206. However, when the corrugated medium 13 is made from light weight paper, the full weight of the rollers 208 may crush the D-F web 18. Thus, it is necessary to reduce the effective weight of the active rollers to about one-half their effective weight (as will be explained) when light weight webs are produced. It may also be advantageous to do so when narrow webs are being produced, even though they are made from heavy paper stock, for the same reason. So long as the D-F web 18 is held flat agianst the hotplates, the necessary heat transfer can be achieved and the use of additional weight adds little to the actual transfer of heat.

Figure 9:
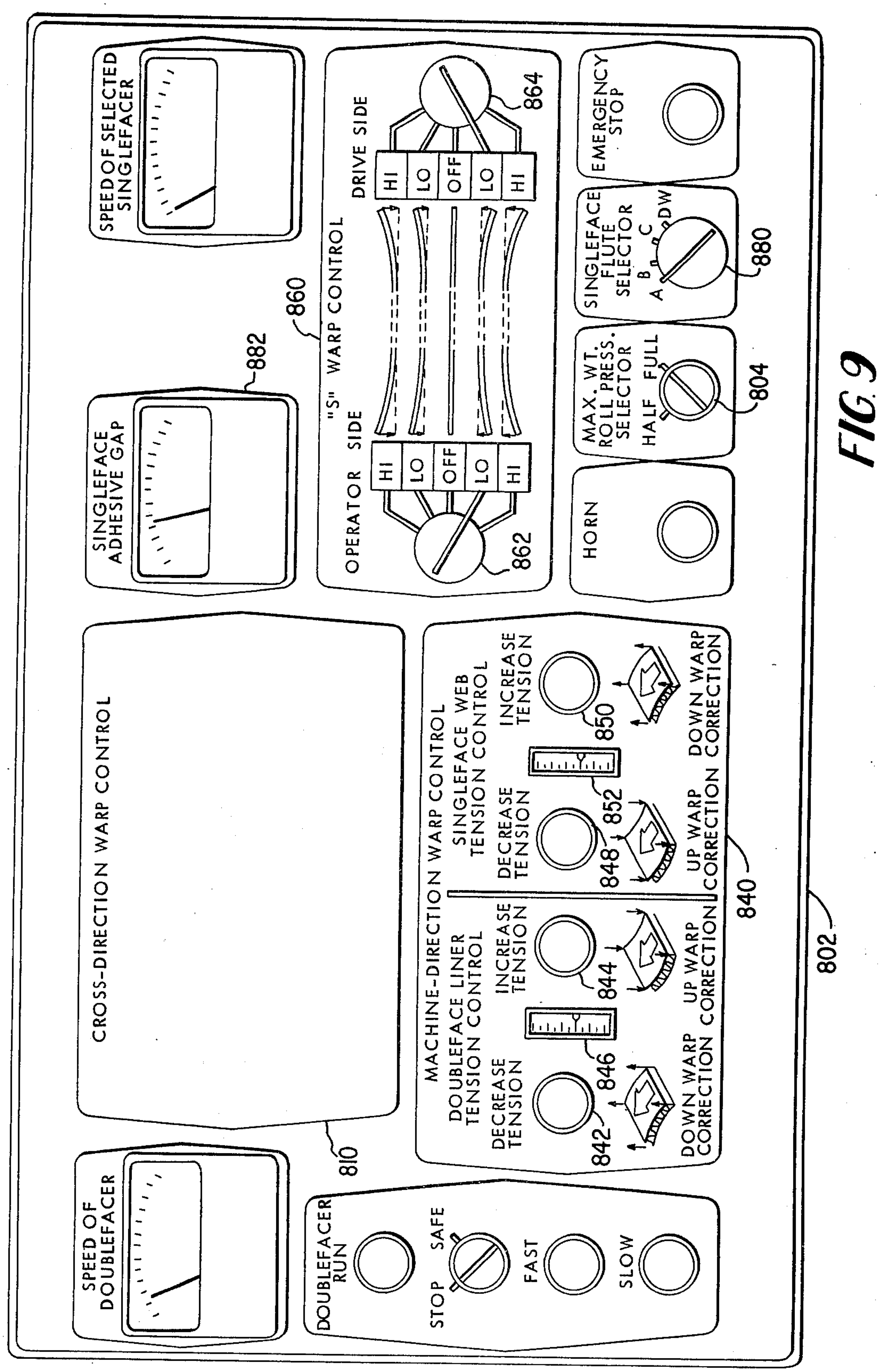
FIG. 9 illustrates a control panel used for practicing the method of the invention.

This then explains the pressure mode selector 804 on the control panel 802 shown in FIG. 9. With the selector turned to the "full" position, the full weight of all the acting ballast rollers 208 will press the ballast belt 206 against the D-F web 18 passing over the hotplates; as the machine speed is decreased, the acting ballast rollers are automatically lifted in sections completely off the belt, beginning with the most downstream section acting at the time and the ballast belt 206 and D-F web 18 are both lifted completely off the hotplates in the area where the ballast rolls are lifted. In this manner, the heating time is controlled in response to machine speed.

With the selector in the "half" position, the effective weight of all the acting ballast rollers 208 is reduced to one-half which is sufficient to hold lighter or narrower webs against the hotplates. Similarly, the acting ballast rollers 208 are lifted completely off the ballast belt 206 in sections as the machine speed is reduced. Thus, heating time is controlled in response to machine speed in both the full and half pressure modes. Advantageously, the operator need only select the proper pressure mode for the web being produced with the machine responding automatically to apply the proper amount of effective weight for the needed time as a function of machine speed. For webs of average weight, the operator will learn by experience whether to select the "half" or "full" mode of operation.

FIG. 6 diagrammatically illustrates a heating section 202 having twelve hotplates 210 arranged in four heating zones 1–4 as previously described. Means (to be explained in greater detail) are provided first for controlling the effective weight of the rollers 208 acting against D-F web 18 through ballast belt 206 from 100 to 50% of their effective weight; second, for lifting the weight rollers 208 in each heating zone and simultaneously applying air pressure beneath the portion of web 18 lying in the heating zone in which the rollers 208 are lifted; and last, for lifting the D-F web 18 and ballast belt 206 completely off the hotplates 210 in all the heating zones.

The chart forming a part of FIG. 6 shows the actual sequence of operation of heating section 202. First, mode 1 or mode 2 is selected by turning selector 804 on control panel 802 to the "half" or "full" position as previously explained. Thus, with the "half" position selected, the chart under "mode 1" applies. In position 1 of this mode, all of the weight rollers 208 would be active, that is, applying about 50% of their weight against D-F web 18 along all of the hotplates 210 in all heating zones 1–4. But should the speed of the double-facer 200 be slowed, so that the time that the D-F web 18 is exposed to heat is too great, then the rollers 208 are automatically lifted above the belt 206 and air pressure is simultaneously applied to beneath the D-F web 18 to lift both it and the belt 206 above the hotplates 210 in heating zone 4. With the web lifted by air floatation above the hotplates 210, extremely little heat is transferred to the D-F web. In this manner, the heating time of the D-F web 18 is controlled. Should the double-facer 200 be slowed still further, then the rollers 208 would be lifted in zone 3 and air pressure would lift D-F web 18 above hotplates 210 in heating zone 3 and similarly in zone 2. When the machine is stopped, all the rollers 208 are lifted; however, instead of air pressure being used to lift the web, mechanical belt lifters 212 are used to lift the D-F web 18 and belt 206 above hotplates 210.

The belt lifters 212 are conventional and their construction and operation are well understood by those skilled in the art. Briefly, hydraulic, air, or electric systems are used to raise the bars 212 upward between the hotplates 210 in the locations shown in FIG. 6. The bars 212 extend across the width of the heating section 202 and physically lift the D-F web 18 and belt 206 above hotplates 210 to prevent burning of the web when the machine is stopped.

As mentioned above, air pressure is used to lift the D-F web 18 above hotplates 210 when rollers 208 are lifted in a particular heating zone. This is accomplished by a web floatation system 220 which includes of plurality of air ducts 222 arranged to direct a large volume of low pressure air to beneath the D-F web 18 between the hotplates 210 in the location shown. The floatation system 220 is divided into three sections as shown corresponding to the respective heating zones 2–4. Thus, as rollers 208 are lifted in a particular zone, air pressure is simultaneously applied beneath the portion of D-F web 18 passing through that zone. The width of the ducts 222 across the width of the machine is less than the width of the narrowest D-F web that the machine is designed to produce so that air pressure is not lost beyond the edges of the web.

A conventional air blower 224 is used to provide air pressure for each heating zone 2–4. When the heating section 202 is slowed to some preselected speed, an electrical signal is produced by a speed sensor such as a tachometer connected to the heating section 202 (not shown) which results in a signal from the control console 800 to the appropriate blower 224 to turn it on. The same signal is also used to energize the system that raises the weight rollers 208. A similar signal is produced when the heating section 202 is stopped to activate belt lifters 212 as previously explained.

The arrangement just described acts in the same manner when operational mode 2 is selected by turning the selector 804 (FIG. 9) to the "full" position, the only difference being that 100% of the effective weight of rollers 208 is applied to D-F web 18. The chart of FIG. 6 beneath "mode 2" shows the sequence of operation and the "position" lines in the diagram above the chart illustrates the position of the weight rollers and web corresponding to operation of the heating zones.

The foregoing system for controlling the heating time of the D-F web 18 provides the needed degree of control. However, it should be understood that a finer degree of control can be achieved, if desired, by dividing the total number of hotplates 210 into shorter zones. It is possible to make each hotplate a heating zone; in this instance, it would be desirable to also supply air pressure beneath the web between each hotplate.

Another alternative to provide finer control would be to raise the weight rollers 208 in a heating zone but permit the belt 206 to continue to press the D-F web 18 against the hotplates 210 rather than simultaneously applying air pressure to lift the D-F web above the hotplates.

Figure 6A:
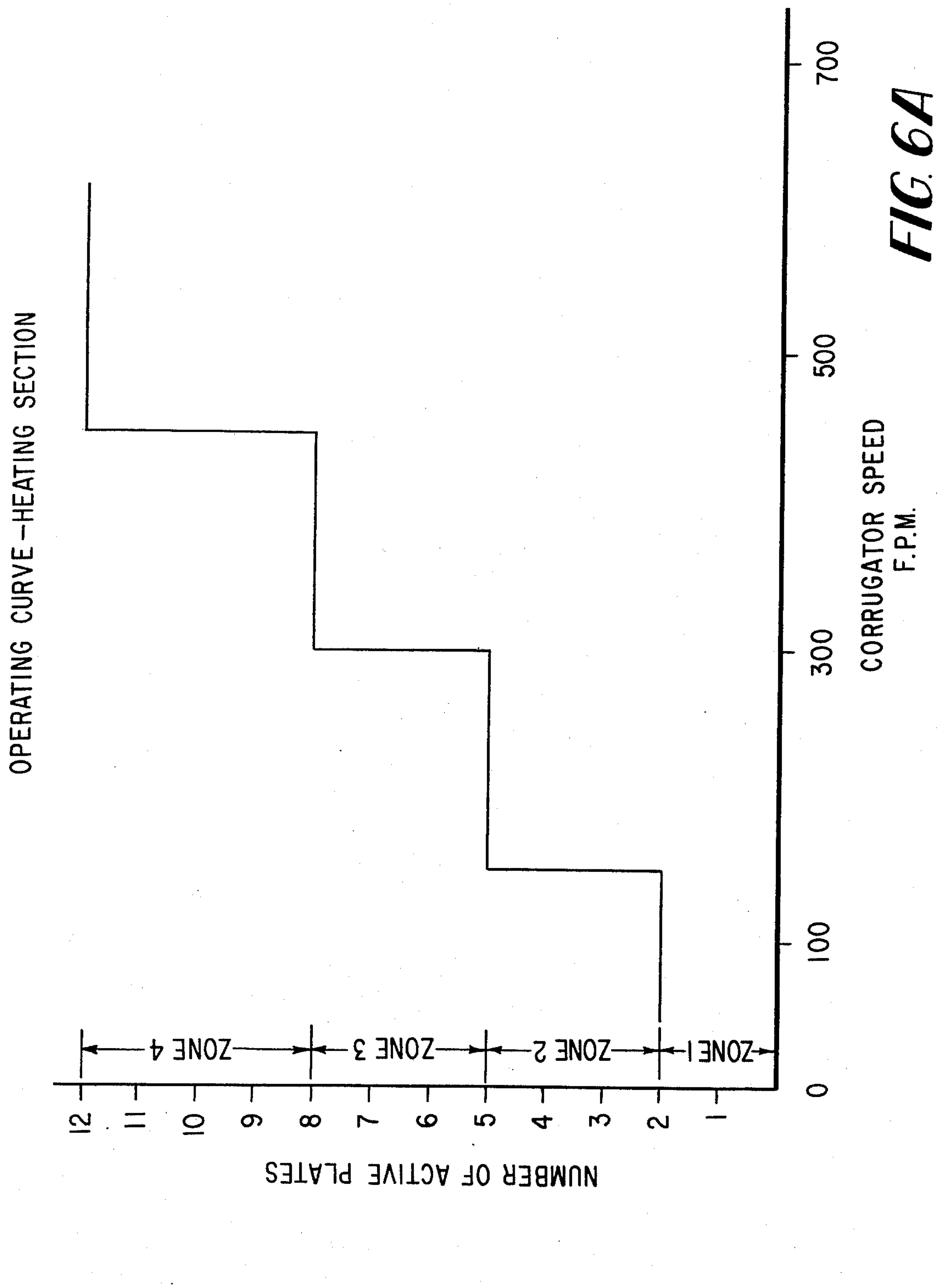
FIG. 6A illustrates a heating curve representing the time that heat is applied to a typical double-face web by the heating section of FIG. 6.

FIG. 6A graphically illustrates the heating time of a typical D-F web 18 being produced in accordance with the arrangement of FIG. 6. From this graph, it can be seen that the first two hotplates 210 in heating zone 1 are always active (except when the web is stopped), that is, they are active because the weight rollers 208 always press the D-F web 18 against them at any machine speed of from 0 to 150 feet per minute of advancing web. In excess of 150 F.P.M., plates 3–5 become active in zone 2 and so on until all zones are being used. However, it should be understood that the control console 800 can be wired such that Zone 2, for example, becomes active at a slower or faster speed of heating section 202 advancing the D-F web 18. Similarly, any zone can be made to become active at some preselected speed differing from those shown in FIG. 6A.

It should also be understood that the control console 800 can be wired such that the heating section 202 will respond to more than one heating curve such as illustrated in FIG. 6A and is preferably arranged to do so since warp in the blanks can be effectively reduced by controlling the heating time of the D-F web 18. This is best understood by reference to FIG. 10 which shows details of the cross-direction warp control 810 shown in blank on FIG. 9.

Figure 10:
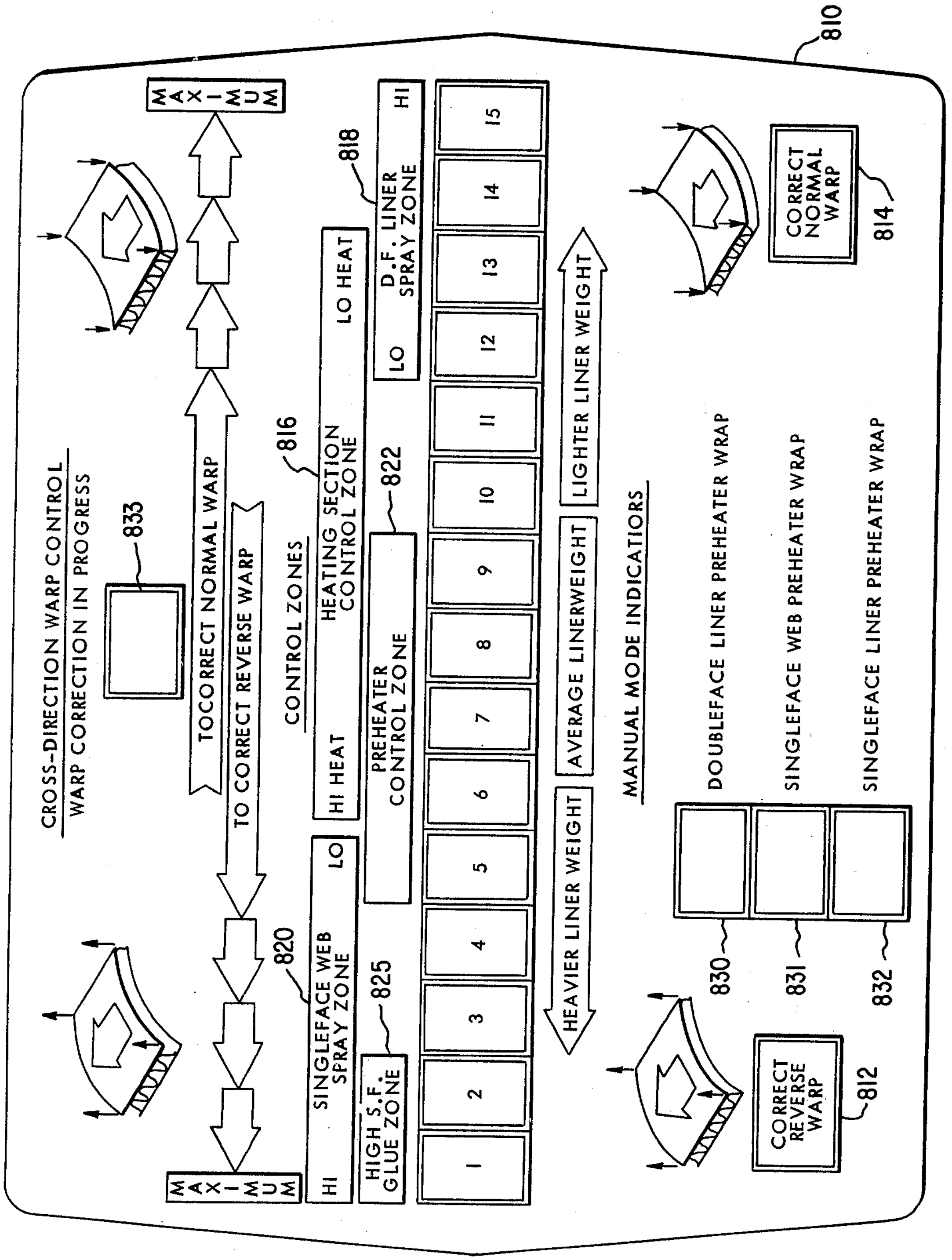
FIG. 10 is an enlarged illustration of the cross-direction warp control shown blank in FIG. 9.

The warp control panel 810 shown in FIG. 10 includes indicator lights 1–15. Each of the lights 6–13 represents a heating curve such as just explained in connection with FIG. 6A; that is, light 8 may represent the curve shown in FIG. 6A for a D-F web 18 of average liner weight. Thus, when light 8 is lit, the heating zones 1–4 (FIG. 6) become effective at the machine speeds shown in FIG. 6A. But, assuming that blanks produced along this heating curve are warped downward, as depicted graphically above the "correct reverse warp" pushbutton 812, then it would be indicative that too little heat is being applied to D-F web 18, causing the blanks to warp downward in the cross-machine direction. To correct such warp, the operator merely depresses the pushbutton selector 812 one time. This lights indicator light 7 which represents a control curve in which heating zone 2 would become effective at a lower machine speed than that shown in FIG. 6A. Similarly, zone 3 would become effective at a lower speed than that shown in FIG. 6A. If moving to light 7 improves but does not eliminate the reverse or down warp, pushbutton selector 812 is again depressed once which moves the light to light 6 which represents a still higher heating curve in which the heating zones become effective at still slower machine speeds. Selector 812 may be depressed as many times as necessary, to light 6, to completely eliminate the warp, each movement indicating another heating curve.

Conversely, if the blanks are warped upwardly (normal warp), then the "correct normal warp" pushbutton selector 814 would be depressed, moving the indicator light from 8 to 9. This, of course, means that the heating section 202 responds to a signal from control panel 812 to cause the heating zones to become effective at higher machine speeds; that is, they become effective along a lower heating curve. Selector 814 may likewise be repeatedly depressed until light 13 is lit to eliminate normal warp, which is determined by observing the blanks issuing from the corrugator 10 on stacks 602 and 604. It should be understood from this that, as the heating section 202 operates along a selected heating curve, represented by lights 6–13, the heating zones 1–4 will each respond to changes in machine speed at different speeds depending on which heating curve is being used. In this manner, normal or reverse warp in the blanks can be observed, corrections can be made to correct the warp, and the proper relationships will be maintained as a function of machine speed. It is also quite clear that the operator need not know what machine elements are responding to his commands since his manual input represents only symptoms of his observations.

However, other factors besides heating time influence up-warp and down-warp in the cross-machine direction. For example, the amount of heat and moisture applied to the various lamina also affect the kind and degree of warp. In addition, the shortest heating time must be sufficient to produce a satisfactory bond and the longest time is determined by physical machine limitations. And yet, the warp may not be completely eliminated within these limits by controlling the heating time as previously explained. This explains why the heating curves are selectable only within the ranges indicated by lights 6–13, also indicated by the control zone bar 816 for the heating section 202.

Therefore, provision is made to control the application of heat and moisture applied to the various lamina. This explains the additional indicator lights extending beyond the lights 6–13 which indicate the heating curves for the heating section 202 as previously explained.

More specifically, it has been found that it is desirable to add moisture to the D-F liner 16 when the heating time has been reduced to its lowest value and the blanks are still warped upwardly. Doing so tends to equalize moisture imbalances and dimensional differences between the D-F liner 16 and the S-F web 12 to eliminate warp in the blanks. In addition, there is an overlap between where moisture should be added and the lower limit of the heating time. Thus, the heating time is reduced to the time indicated by light 12, moisture is also added to the D-F liner 16 by water spray assembly 168 (to be explained). Similarly, additional moisture is added when the time is reduced to that indicated by light 13; further additional amounts are added for C-D down warp corrections indicated by lights 14 and 15 although the heating time cannot be reduced beyond that indicated by light 13. The control zone bar 818 illustrates the overlap between the warp control by heating time and by water spray.

Figure 5:
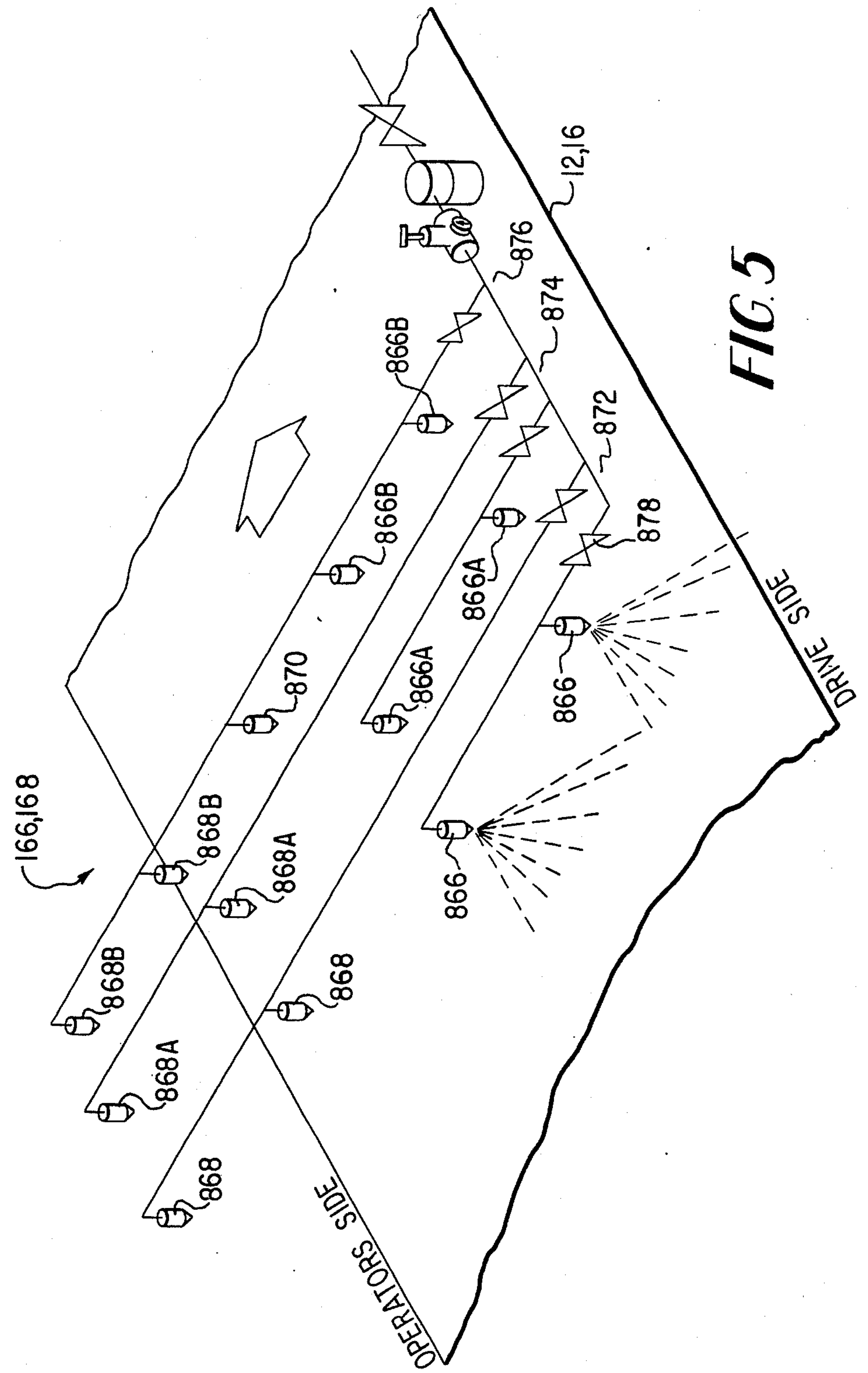
FIG. 5 is an enlarged schematic illustration of the single-face web spray assembly shown in FIG. 1.
Figure 5A:
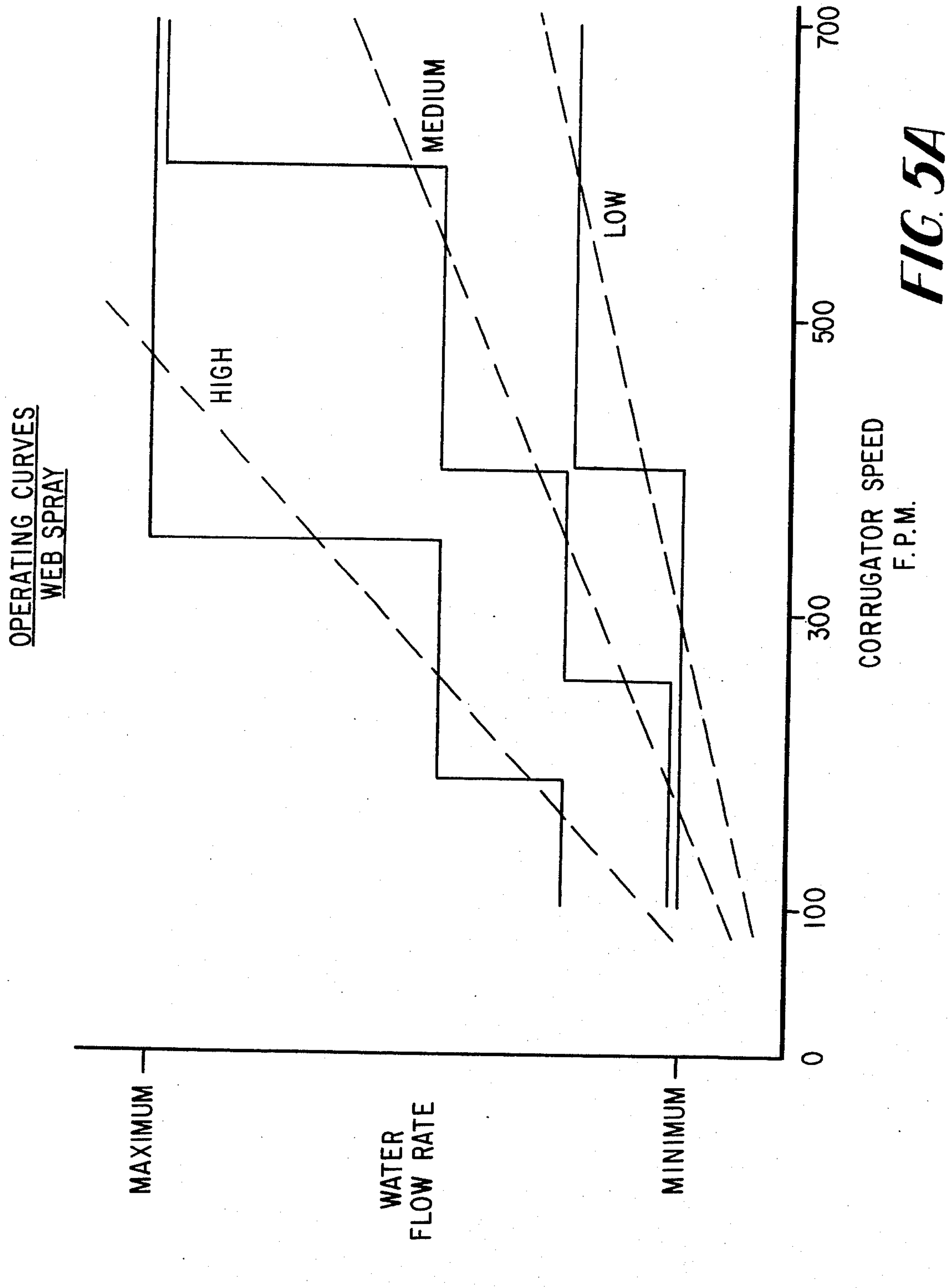
FIG. 5A illustrates a moisture curve representing the amount of moisture applied to a typical single-face web by the water spray assembly of FIG. 5.

Moisture is added to D-F liner 16 in accordance with the moisture curve values graphically illustrated in FIG. 5A. Moisture is added along three curves in a manner similar to that described for the heating time in FIG. 6A. That is, a minimum amount is added along the "low" curve in FIG. 5A at the lowest running speed of the machine when the heating time corresponding to light 12 prevails; additional water is added as machine speed increases at the speeds indicated on the graph. This same curve is used when the heating time is reduced to correspond to light 13. However, when the heating time is reduced to its shortest value (light 13), water is added along the "medium" curve of FIG. 5A when the warp correction selector 814 is depressed to move the correction to light 14. Similarly, when the correction is moved to light 15, water is applied along the "high" curve. It should be noted that the dotted lines of FIG. 5A represent the theoretical slope of the curves; however, the control console 800 is wired such that water is added in steps corresponding to machine speed as indicated by the solid lines.

For reverse or down warp, factors other than heating time and moisture affect the amount of warp. However, moisture does have an effect and water, in this instance, is applied to the top of the S-F web by water spray assembly 166 shown in FIG. 1. But, water is added only after the maximum heating time is reached as indicated by light 5. The control zone bar 820 shows that water is added for "correct warp" positions 1–5, such positions being achieved by depressing "correct reverse warp" selector 812. For positions 1–5, water is applied, as just explained for lights 12–15, along the curves shown in FIG. 5A with the "low" curve being used for light position 5, the "medium" curve for light position 4, and the "high" curve for light positions 3, 2, and 1.

Another factor affecting C-D warp is the amount of heat in the S-F liner S-F web, and D-F liner. The presence of down warp in the blanks at, for example, light position 9 indicates that the S-F web is heated excessively relative to the D-F liner. Therefore, either the heat applied to the D-F liner may be increased or the heat applied to the S-F web may be decreased. To correct the down warp, the "correct reverse warp" selector 812 is depressed to move the warp control to light position 8. Besides increasing the heating time for the D-F web as previously explained, the distance that the D-F liner is wrapped around roll 174 of D-F liner preheater 164 (FIG. 1) is increased; however, the amount of wrap of the S-F liner and S-F web around the preheater rolls 114 and 170 respectively remains the same. If the down-warp is not corrected by this correction, selector 812 would be depressed to move the warp correction to light 7. Again, the heating time is increased, as previously explained, but instead, the S-F web preheater wrap is decreased while the D-F liner wrap remains the same. The effect of this is to change the relative amount of heat between the S-F web and D-F liner while maintaining the proper amount of heat in both for adhesive curing in the heating section 202. At times, it may even be necessary to change the wrap of the S-F liner around preheater roll 114, as in moving from light position 7 to light position 6. Which of the preheater wraps to be changed is not critical and the control console 800 may be wired to vary the warp of the webs as desired. However, heat is applied to the webs at warp control light positions 5–9 as indicated by the control zone bar 822 as shown in FIG. 10. In addition, the heat is applied along the curves shown in FIG. 4A so that the amount of heat increases as machine speed increases, the "low" curve is used to apply heat to the D-F liner in warp correction positions 9–15 (as indicated by lights 9-15); the "medium" curve is used in positions 6–8; and the "high" curve is used in positions 1–5. For applying heat to the S-F web, the "low" curve is used for positions 1–7 and the "high" curve is used for positions 8–15, no medium curve being used. For applying heat to the S-F liner, the "low" curve is used for positions 1–6 and the "high" curve is used for positions 7–15. It should be noted that the amount of preheater wrap does not change in positions 1–4 and positions 10–15. Therefore, the preheater wrap position in effect at position 5 is maintained in positions 1–4 and the position in effect at position 9 is maintained in positions 10–15. It should also be recognized that when the warp control positions are changed from 5 to 6 for example, the amount of wrap will be in reverse to the amount of wrap in moving from position 6 to position 5.

Figure 11:
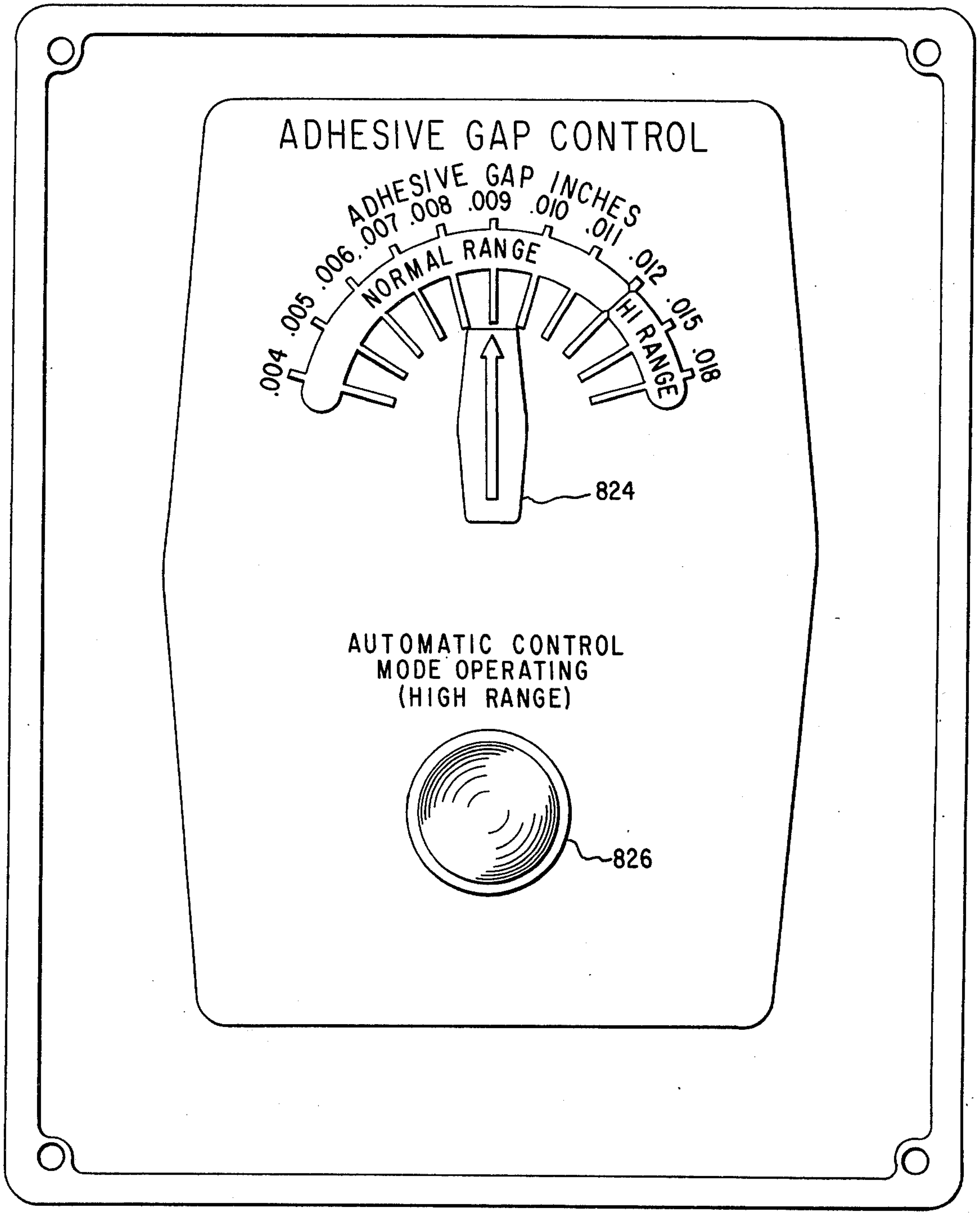
FIG. 11 illustrates a local control panel for the glue applicator assembly of FIG. 3.

In addition to the moisture applied to the S-F web in warp control positions 1–5, it has also been found that the amount of glue applied to the medium web 13 also affects the moisture content of the S-F web. However, it should be recognized that a minimum amount of glue is needed to achieve a satisfactory bond. Thus, the amount of glue applied at the single-facer 100 is usually controlled by the single-facer operator in accordance with conventional practice. The amount of glue applied to the medium web 13 is controlled by manually adjusting the gap between the adhesive applicator roller and a doctor roller (both conventional — indicated "gap" in FIG. 1). For the purpose of this invention, the adjusting mechanism for varying the glue gap has been motorized and a local control provided to enable the operator to remotely select the desired gap; this local control is shown in FIG. 11. The normal glue gap varies between 0.004 and 0.012 inches between the rolls. The operator may select any setting within this range by turning the selector 824 to the desired setting. The selector is electrically connected to the adjusting motor which turns the adjusting mechanism until the desired setting is made (to be explained).

However, when extreme C-D down warp exists in the blanks, the longest heating time (reached at light position 6), the largest amount of water spray (reached at light position 3), and the highest amount of heat (reached at light position 5) may not be sufficient to completely eliminate the warp. Therefore, when the C-D warp control is selected at light position 2, the control is wired to override the setting of selector 824 and change the space between the rolls to, for example, 0.015 inches. Similarly, when light position 1 is selected, the space is changed to, for example, 0.018 inches. The effect of increasing the glue gap is to add moisture to the S-F web from the glue which tends to correct the down warp in the blanks. The zone control bar 825 indicates the selectors for which the adhesive gap control is operating automatically.

The local control of FIG. 11 also includes an indicator light 826 wired to the control console 800 which is lit when light positions 2 and 1 are selected to let the single-facer operator know that he cannot change the glue setting when the light 826 is lit. When it is extinguished, by the warp control being selected at any lighted position other than 1 and 2, the single-facer operator knows he can again control the glue gap setting, the selector 824 having remained in its original setting before being overriden by the selectors 1 and 2.

Local controls are also provided (not shown) for manually controlling the amount of wrap around the preheater rolls of the D-F liner, S-F web, and S-F liner. This is necessary to enable the operator to thread new paper through the preheaters since the wrap arms (to be explained) may interfere. These local controls are arranged similar to the one shown in FIG. 11 for the glue gap control except that the local operator may switch the control from automatic to manual operation. When this is done, the appropriate one of indicator lights 830, 831, and 832 light up on control panel 810 of FIG. 10, to let the console operator know that manual adjustments are being made and that all of the automatic settings for a specific preheater have been overriden.

Control panel 810 also includes an indicator light 833 that comes on when one of the warp control selectors 812 or 814 is depressed and the machine is responding to the correction. The light 833 is connected to the speed signal corresponding to the speed of the machine, hence the speed of the D-F web, so that it goes out approximately at the time that blanks produced in accordance with a new warp correction have reached the stacks 602 and 604 (FIG. 1). Thus, when the light goes out, the operator can observe the blanks to see if further correction is needed.

The main control panel 802 in FIG. 9, of which panel 810 is a part, includes controls for correcting M-D warp. As was previously explained, M-D warp may result from dimensional differences and heat, moisture, and tension imbalances in the various webs but it has been found that M-D warp can be controlled solely by varying the relative tension of the webs. The M-D warp control, denoted by numeral 840, includes two pushbutton selectors 842 and 844 of which selector 842, when depressed, progressively decreases the tension in the D-F liner, as indicated on dial 846, to correct M-D down warp in the blanks. To correct for up warp, the selector 844 is depressed to increase the tension in the D-F liner. This is physically achieved by a signal from the control console 800 to the braking circuit of the D-F liner roll stand 110 (FIG. 1). The braking circuit, which may be of a conventional type as previously mentioned, responds to the signal from the console 800 to increase or decrease the tension in the D-F liner 16. The up and down warp pictorial indicia on panel 840 indicates which selector 842 or 844 should be depressed to correct the warp.

Control panel 840 also includes pushbutton selectors 848 and 850, and a dial 852, for controlling tension of the S-F web 12. These controls operate in similar fashion to those just explained for the D-F liner. Physically, a signal from control console 800 controls the amount of suction applied by a vacuum brake 150 (FIG. 1) to apply more or less vacuum to the S-F web 12 at that location thereby increasing or decreasing the tension in the S-F web 12 to correct up warp or down warp as indicated by the pictorial indicia on panel 840.

The tension applied to the S-F web and D-F liner corrects M-D warp independent of web speed. Therefore, it is not necessary to feed back the speed of the double-facer 202 to the tension controls just described. In addition, it does not make a great deal of difference whether the tension of the S-F web is changed relative to the tension of the D-F liner. However, in practice, if the dial indicator 846, for example, is near to one end of the scale, it is better to make a correction with the other tension control.

The main control panel 802 also includes controls for correcting S-warp. These controls are on the panel 860 of FIG. 9 and include rotatable selectors 862 and 864 adjacent the indicia shown. S-warp is mainly controlled by the addition of moisture by the water sprays 166 and 168 (FIG. 1). To fully understand the S-warp correction, it should first be recognized that the moisture content of the S-F web and D-F liner may be unequal across the width of the machine. Furthermore, it should also be remembered that the combined D-F web 18 is usually divided into at least two parallel advancing webs 20 and 22 by the slitter 300 (FIG. 1) although it is not unusual to divide the web 18 into several more parallel webs. Thus, keeping in mind possible unequal moisture distribution, it is possible that some of the blanks issuing from mthe corrugator 10 will be warp free, especially on one side of the machine, and others will not be. Thus, for the warped blanks, a correction is needed.

The pictorial indicia between selectors 862 and 864 indicates the various possible warp conditions of the web in the cross-machine direction; the arrows indicate in which direction the selectors should be rotated to correct the warp condition. The selectors are electrically connected to the water supply assemblies 166 and 168. Each water spray assembly is divided into at least two spray zones across the width of the webs as shown in FIG. 5 so that the water spray (indicated by dotted lines) from nozzles 866, 866A, and 866B is directed against the half of the web on the drive side of the machine as shown and the spray from nozzles 868, 868A and 868B is directed against the half of the web on the operators side. Thus, when the blanks issuing from the drive side of the machine are warped downward for example, the selector 864 would be turned to the "lo" position as shown in FIG. 9 and water would be sprayed at a low rate onto the drive side half of the S-F web in accordance with the "low" curve shown on FIG. 5A. If the warp is not corrected by this correction, selector 864 is moved to the "hi" position below the position shown; then water is sprayed in accordance with the "high curve" on FIG. 5A.

Similarly, if the blanks are warped upward on the drive side, selector 864 would first be turned to the "low" position above horizontal which controls the web spray assembly 168 for the D-F liner. Again, the selector 864 may be turned to the "hi" position to increase the water spray onto the D-F liner.

The selector 862 is used in the same manner to control the water spray applied to the operators side of the S-F web and the D-F liner. The various "hi" and "lo" indicia are individually lit to indicate the position of the selectors 862 and 864.

However, the water spray assemblies 166 and 168 serve a dual function in that they apply moisture to the total width of the S-F web and D-F liner depending on the C-D warp control positions 1–5 and 12–15 as previously explained. And, it must be remembered that the amount of moisture is applied along the curves shown in FIG. 5A. Thus, both water spray assemblies 166 and 168 include three banks of nozzles 872, 874, and 876 of which banks 872 and 874 are divided into two zones across the width of the web, as shown, for the correction of S-warp as previously explained. The third bank 876 is not divided. When the water sprays are operated along the lower curve of FIG. 5A, which has only two steps, then the first bank 872 is turned off the bank 874, having a greater flow rate, is turned on. If the warp control selector is moved, for example, from light position 5 to 4, then the next higher curve, having four steps, is used to provide additional water. Thus, bank 872 may be turned on in addition to bank 874. For the next step along the curve, banks 872 and 874 may be turned off and bank 876, having a greater flow rate of bank 874, turned on. In response to a further warp correction, for example, from light position 4 to 3

(FIG. 10) the highest curve is used and bank 872 may be turned on in addition to bank 876 and so on.

Thus, it can be seen that the water sprays follow the curves of FIG. 5A, the sprays being applied to either the S-F web or D-F liner depending on the position of the C-D warp control along lighted positions 1–5 and 12–15. The water sprays, when used in zones for S-warp correction, also follow water flow rate curves (not shown) essentially the same as those shown in FIG. 5A because S-warp correction is also dependent on web speed, that is, they maintain the moisture content of the webs as a constant, more water must be added as web speed increases.

The banks of water sprays include the nozzles numerically identified on FIG. 5. The nozzles are conventional fan spray types which provide an overlapping spray as shown at a rate in accordance with the size selected. Conventional electrically operated solenoid valves 878 are electrically connected to control console 800 and are turned on and off automatically by operation of the C-D warp control selectors 1–5 and 12–15 as well as S-warp selectors 862 and 864 to provide water sprays in accordance with the water flow rate curves for C-D warp shown in FIG. 5A and similar curved for S-warp correction (not shown) as previously explained.

Although water sprays 166 and 168 have been shown divided into two zones for S-warp correction, they may be divided into additional zones if desired to provide a finer degree of control. The two zones illustrated have proved satisfactory for a corrugator 10 capable of producing webs 87 inches wide; for corrugators of greater width, a third zone, or more, may be provided for adequate control.

To assure even distribution and penetration of the water in the webs, the wetted side of the S-F web and D-F liner are preferably passed around small preheater rolls 180 in the glue station 162, as shown in FIG. 1, before the webs enter heating section 202. The bank 876 also includes another nozzle 870 in the center to provide additional moisture when this bank is used for C-D warp control.

In practice, if S-warp appears in the blanks, the C-D warp control should first be tried as a corrective measure before using the S-warp control since it has been found that S-warp can sometimes be corrected in this manner.

The control panel 802 of FIG. 9 also includes a single-face flute selector 880. It should be understood that corrugators 10 often include more than one single-facer so that S-F webs having different flute heights, commonly called A, B, and C flutes, may be produced on the same corrugator as well understood by those skilled in the art. (only one single-facer shown in FIG. 1) It is also possible to combine, for example, an A-flute S-F web to a B-flute S-F web and both to a D-F liner in the double-facer 200 to make double-wall (DW) corrugated paperboard, also well understood by those skilled in the art. The present invention is equally applicable to the production of DW paperboard although the additional machines for doing so have not been shown in FIG. 1. Thus, selector 880 is used to select the desired flute height or DW board; the effect of the selection is to connect the control console 800 to the appropriate glue gap control of the single-facer being used as well as to the appropriate S-F liner preheater control and so on.

Control panel 802 also includes a dial 882 which also indicates the actual dimension of the glue gap on the single-facer that is set by the single-facer operator with selector 824 on the local control shown in FIG. 11. Other indicators and selectors are also on control panel 802 as identified thereon; their purpose is apparent from the associated indicia and no further explanation is believed necessary since they do not relate directly to the present invention.

The foregoing has explained the purpose, operation, general and sometimes specific construction of the various controls and responsive elements of the system of the present invention, in particular, the manner by which the heating time, amount of heat, moisture, and tension are maintained as constants even though the speed of the corrugator 10 is varied for production reasons. To the extent that they have not already been explained, various ones of the responsive machine elements will now be explained in greater detail.

Figure 3:
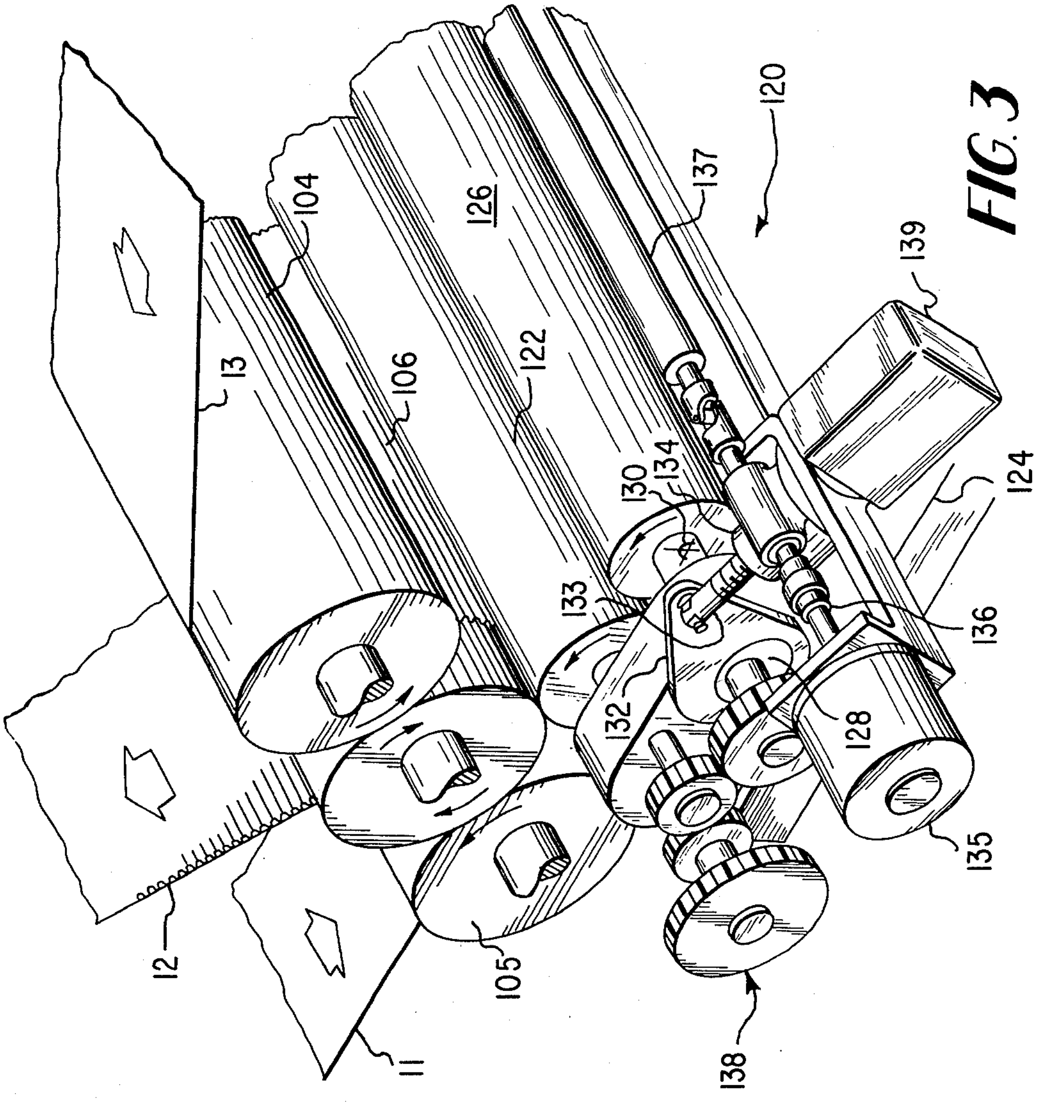
FIG. 3 is an enlarged schematic illustration of the glue applicator assembly for the single-facer shown in FIG. 1.

For example, FIG. 3 isometrically illustrates a portion of the adhesive applicator assembly 120 for the single-facer 100. It has been previously explained that the medium liner 13 is corrugated by corrugator rolls 104 and 106 and adhesively joined to S-F liner 11 between lower roll 106 and pressure roll 105 to form S-F web 12. This is accomplished by applying adhesive to the tips of the flutes with an applicator roll 122 rotating in contact with the flutes as shown in FIG. 3. The arrows show the relative direction of rotation of the various rolls. Adhesive is picked up from a pan 124 by the applicator roll 122; the counter-rotating doctor roll spreads the adhesive into a thin film on applicator roll 122 before the adhesive is applied to the flute tips of medium 13.

As previously explained, the thickness of the adhesive on the applicator roll affects the amount of moisture in S-F web 12. The film thickness is controlled by the spacing or gap between the doctor roll 126 and applicator roll 122 as well understood by those skilled in the art. This is physically accomplished by adjusting the position of roll 126 relative to roll 122. To do so, the doctor roll 126 is floatably mounted in conventional eccentric bearings 128 of which one is shown. By rotating the eccentric bearing 128, it can be seen that the axis of roll 126 will follow the eccentric path 130 thereby moving the roll 126 closer to or farther away from roll 122.

The eccentric bearing 128 is adjusted by having it mounted in a lever 132; thus, so the lever is moved, the axis of roll 126 is moved. The lever 132 is moved toward and away from roll 122 by a rod 133 extending from a conventional right-angle jaw-screw gear box 134 and connected to the lever. The rod 133 is moved in and out of gear box 134 by a bi-directional motor 135 connected to an input shaft 136 of gear box 134. A connecting rod 137 connects gear box 134 to a similar gear box, rod, lever, and eccentric on the opposite side of the machine (not shown) so that both ends of roll 126 may be simultaneously and precisely positioned. In addition, suitable sets of gears 138 are provided for driving the rolls 122 and 126 at the current speed and direction of rotation in the conventional manner.

The motor 135 is energized by an electric signal from the local control panel of FIG. 11 or from the C-D warp control positions 1 and 2, the functions of which have been previously explained. To control the exact position of the roll 122, the rod 133 extends from the opposite side of gear box 134 into a potentiometer 138 which produces a voltage output directly proportional to the lineal position of rod 133. Likewise, the local control of FIG. 11 includes an electrical circuit (not shown) which produces an output voltage that corresponds to the desired dimensional setting of the gap between rolls 122 and 126; similarly, C-D warp control positions 1 and 2 of the control panel 810 (FIG. 10) produce voltages corresponding to the settings for those positions. The voltages from either the local control panel or the console 800 are compared by the comparator circuit and when the voltages match, a null signal is produced which controls operation of a starter circuit on motor 135 to stop the motor. Thus, when a new gap setting is selected, motor 135 runs in the correct direction until the null signal turns it off. In this manner, the glue gap dimension is both manually and automatically controlled.

Figure 4:
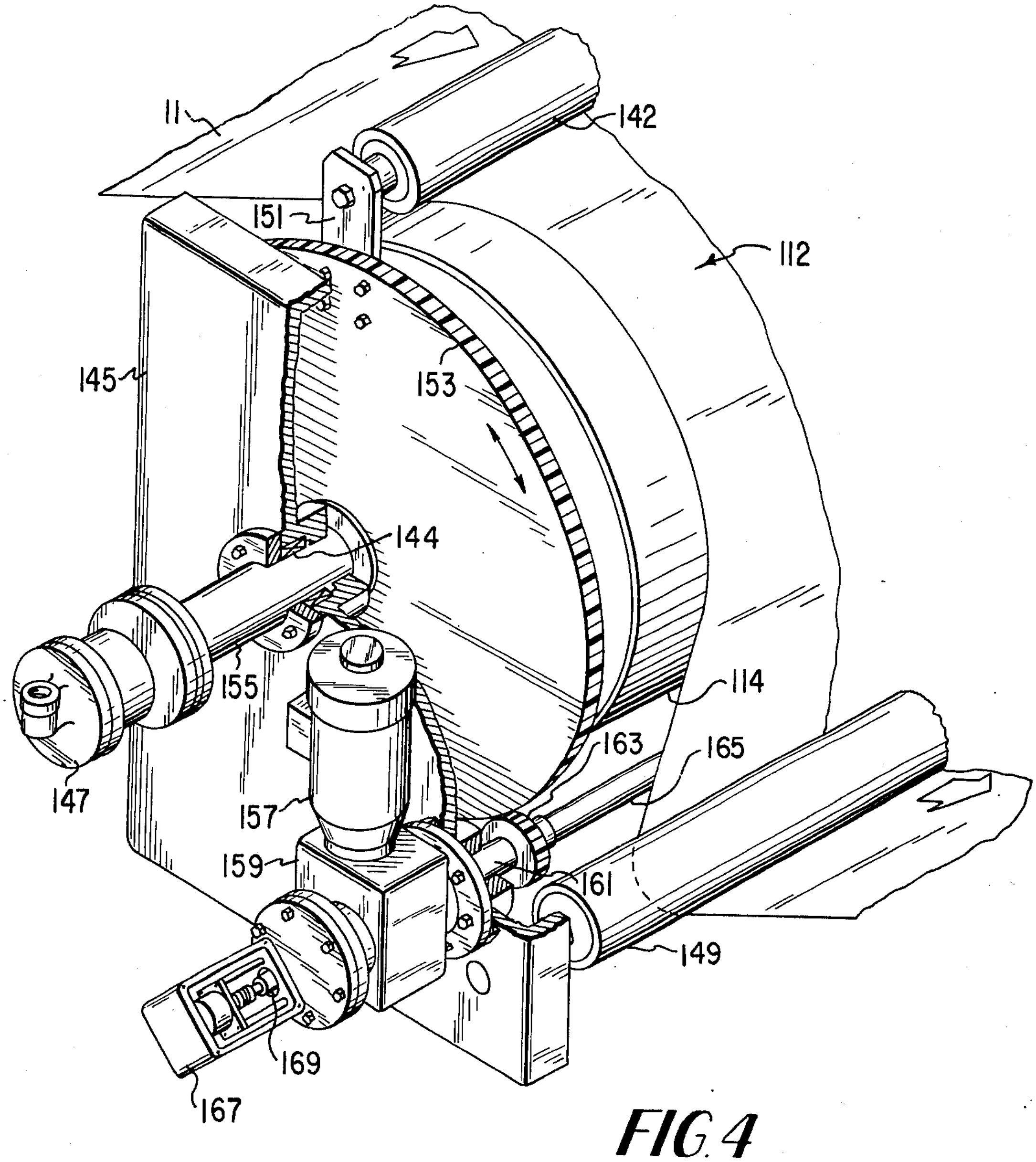
FIG. 4 is an enlarged schematic illustration of the single-face liner preheater assembly shown in FIG. 1.

The amount of wrap of the S-F liner, S-F web, and D-F liner around their respective preheater rolls is controlled by the apparatus shown in FIG. 4, which is substantially identical for the single preheater 112 and double preheater 164 (FIG. 1); to simplify illustration, FIG. 4 shows a single preheater such as preheater 112 of FIG. 1 although the movable wrap arm 142 is shown in a minimum wrap position whereas it is shown in a maximum wrap position in FIG. 1 as indicated by dotted line 143.

The preheater 112 includes a large hollow roll 114 of conventional construction mounted for rotation in bearings 144 in a main support 145. Steam is introduced through a conventional rotary union 147 to heat the roll 114 to the desired temperature. Roll 114 is rotated solely by the friction of the S-F liner passing around the roll.

A guide roll 149 is also bearing mounted for rotation in support 145 at the fixed location shown to maintain the position that the S-F liner 11 leaves roll 114. However, the position that the S-F liner 11 comes into contact with roll 114 is variable in accordance with the circumferential position of wrap roll 112 around roll 114 to provide the amount of wrap desired to control the amount of heat applied to S-F liner 11.

The orbital position of wrap roll 142 is accomplished by bearing mounting if for rotation between a pair of support arms 151 (only one shown) which in turn are secured to a large toothed gear 153 which is bearing mounted around the journal 155 of roll 114. It should be understood that the gear 153 may be rotated around the journal 155 without affecting rotation of roll 114. Thus, it can be seen that rotation of gear 153 counterclockwise, as viewed in FIG. 4, will move wrap roll 142 to another position around roll 114 and thereby changing the distance that S-F liner 11 is wrapped around the heated roll 114.

Figure 4A:
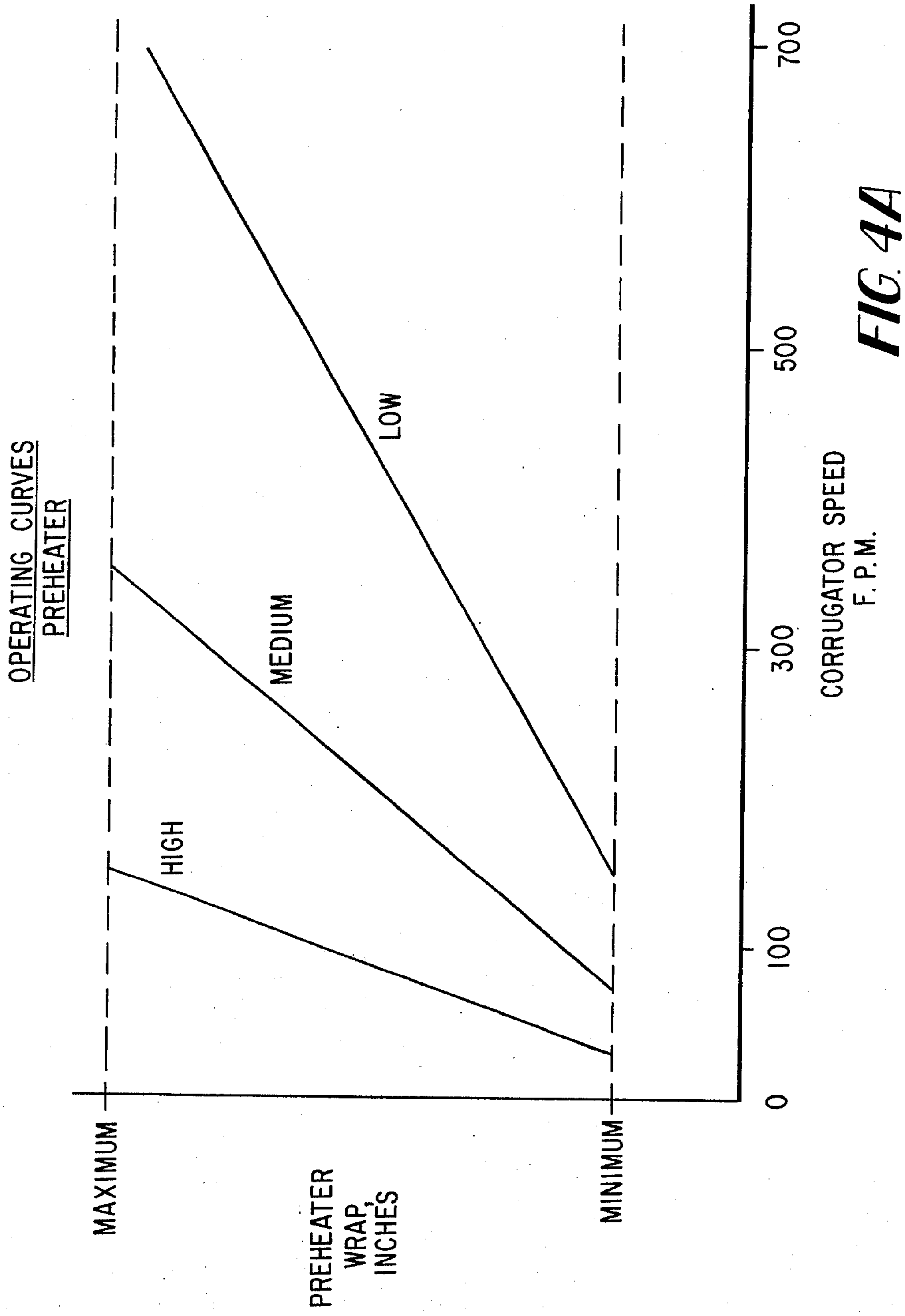
FIG. 4A illustrates a heating curve representing the amount of heat applied to a typical single-face liner by the preheater of FIG. 4.

It has already been explained that the amount of wrap controls the amount of heat applied to S-F liner 11 and that the amount of heat is maintained constant by increasing the amount of wrap as the speed of the web is increased in accordance with the heating curves shown in FIG. 4A. The gear 153 is rotated by an electric motor 157 connected to a conventional right angle gear box 159 secured to support 145. Gear box 159 includes an output shaft 161 upon which a small pinion gear 163 is secured in meshing engagement with the large gear 153. Thus, operation of positioning motor 157 rotates gear 153 to position the wrap arm 142 around the circumference of large roll 114. A cross shaft 165 connects output shaft 161 to a similar pinion 163 and gear 153 on the other side of the machine (not shown).

The exact position of wrap roll 142 is controlled by a potentiometer 167 connected to an opposite end 169 of output shaft 161. The potentiometer 167 includes a conventional comparator circuit, similar to that described for the one used to control the glue gap, that produces an output voltage that corresponds to the circumferential position of the wrap arm 142. Voltage signals are produced by the selection of C-D warp positions 5–9 (FIG. 10) corresponding to the wrap position desired for the wrap roll 142 for the position selected. Positioning motor 157 is caused to run by a change in the C-D warp control positions and will continue to run until the signal from the potentiometer matches that produced by the C-D warp control position selected. When the signals match, a null signal is produced to stop the motor 157 through its starter circuit. The voltage signals from the warp control positions 5–9 change in response to a change in machine speed so that the wrap arm 142 is positioned automatically to change the wrap and thus the amount of heat applied to the S-F liner as a function of machine speed.

The construction and operation of the web spray has already been explained in detail. Therefore, the remaining responsive machine elements to be explained are the weight roll lift and web floatation systems. Since these elements operate in conjunction with each other, they will be described together.

Figure 7:
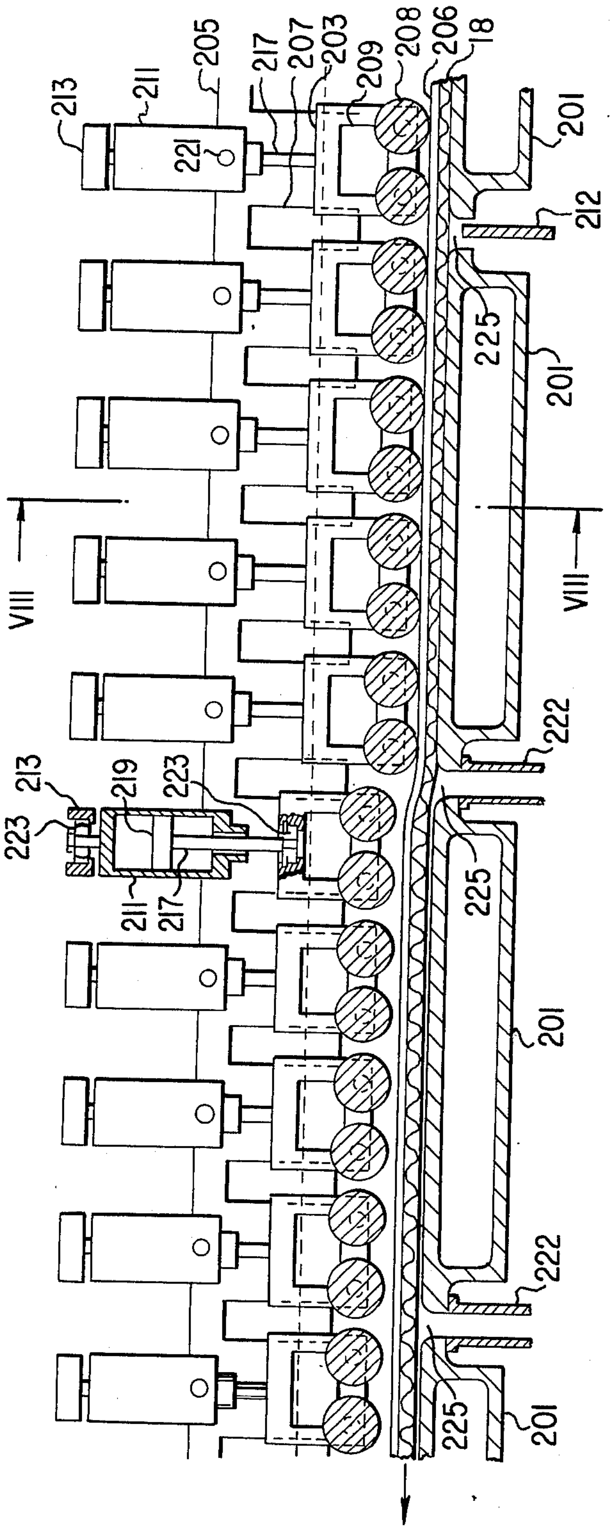
FIG. 7 is an enlarged portion of FIG. 6 showing, in side elevation, details of the hotplates, weight roll lifters, air lift ducts, and lift bars.

FIG. 7 shows a responsive portion in side elevation of the weight roll lift and web floatation apparatus forming a part of the heating section 202. A series of steam heated hotplates 201 are arranged in the conventional manner to provide a flat substantially continuous top surface across which the combined D-F web 18 is pulled by the lower flight of ballast belt 206 lying on top of the web. A series of ballast or weight rollers 208 are positioned above the belt 206 and are arranged such that their full weight presses the belt 206 against D-F web 18 to press the web in flat sliding contact with plates 201. The rollers are also arranged so that approximately one-half their effective weight may be applied to the web 18 through the belt 206 (to be explained) and arranged to be lifted completely above the belt 206 and web 18. When the rollers 208 are raised, as shown on the left side of FIG. 7, a high volume of low pressure air is directed beneath web 18 to lift both it and belt 206 above the plates 201. Lifting web 18 substantially prevents heat transfer from plates 201 to D-F web 18.

In accordance with usual practice, about eight weight rolls 208 weighing about 150 150 each for an 87 inch corrugator are supported above each plate 201. In accordance with this invention, pairs of the rollers 208 are rotatably mounted between slide blocks 203 which are supported for vertical sliding movement on longitudinally extending side rails 205 on both sides of the machine (only one side shown in FIG. 7 and 8). Specifically, a number of guide blocks 207 are secured to rail 205 each block 207 being between two slide blocks 203 supporting a pair of weight rolls 208. The slide blocks 203 include slots 209 which staddle a portion of the guide blocks 207 to support them for vertical sliding movement.

Vertical movement of each pair of rolls 208 is achieved by a conventional air cylinder 211 supported by a self-aligning bearing 215 to prevent binding. Cylinder 201 includes a rod 217 connected to the top of the slide block 203 so that when air pressure is applied to beneath the piston 219, the pair of rolls 208 are lifted. To do this, air from a conventional pressure source (not shown) is introduced through air line into cylinder 211 beneath piston 219. Air above piston 219 is vented to atmosphere through vent 223. When air pressure is removed from supply line 221, the weight of the pair of rollers 208 and their supporting apparatus described above causes them to descend against the belt 206.

To apply substantially one-half the weight of rolls 208 against the belt 206 and web 18 as explained in connection with FIG. 6, it is necessary only to provide air pressure in supply line 221 that corresponds to substantially half the weight of each pair of rolls 208 and their supporting apparatus which is easily calculated by those skilled in the art. The effect of this is to reduce the effective weight of the rolls 208 against the D-F web 18. This arrangement is particularly advantageous since the physical vertical location of rolls 20 need not be changed to achieve the desired effective weight. Furthermore, it permits the rolls 208 to rise freely to accommodate extra thicknesses of webs caused by splices and to accommodate webs of different flute heights and even double-wall board, without adjustment since the air pressure works independently of the vertical position of piston 215.

Figure 8:
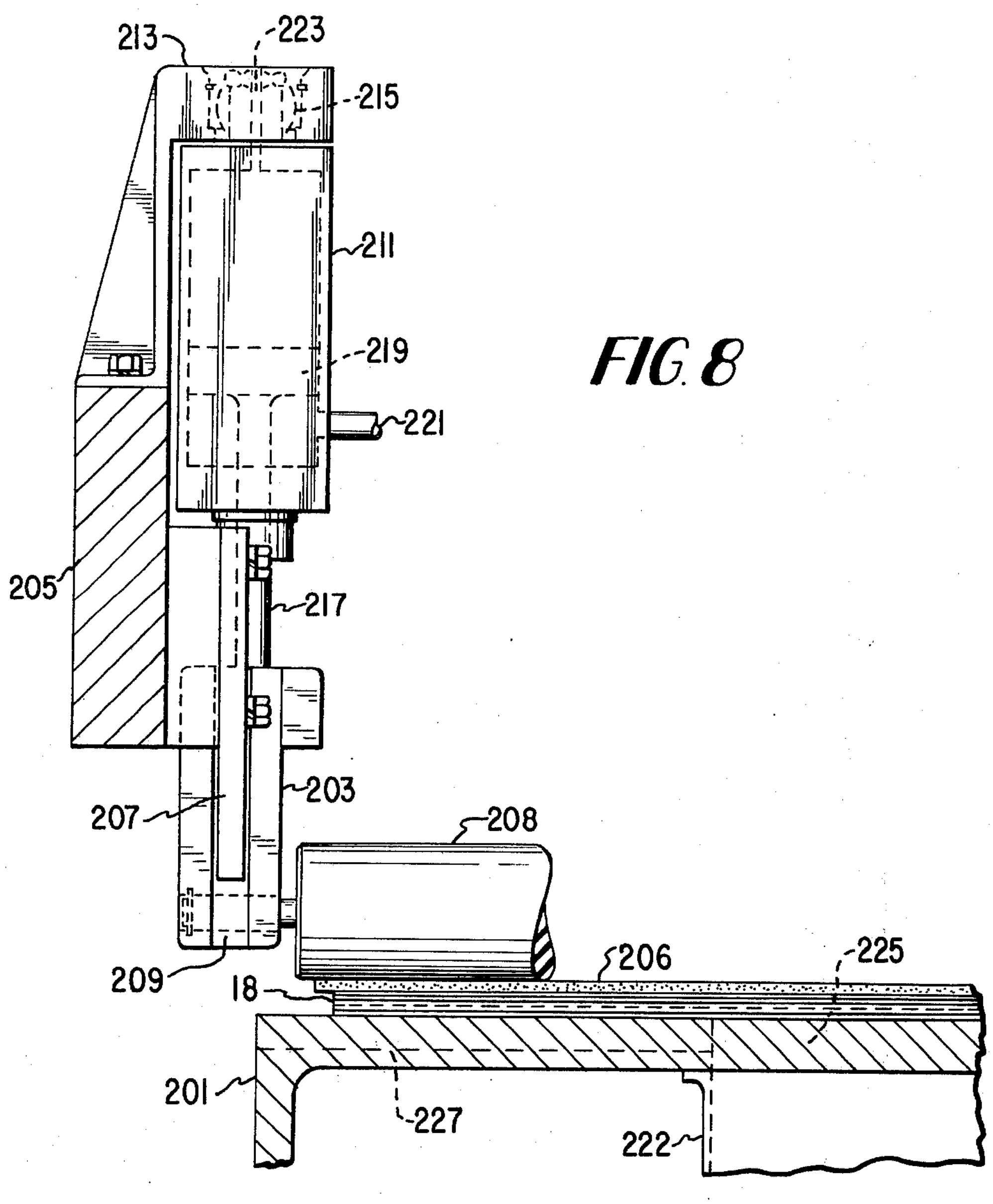
FIG. 8 is an end view of a portion of the apparatus of FIG. 7 taken along line VII—VII.

When the rolls 208 are lifted above the belt 206, air is supplied to beneath the D-F web 18 by the blowers 224 as described in connection with FIG. 6. The air is directed beneath the web 18 by ducts 222 connected to the edges of hotplates 201 which are spaced slightly apart as shown in FIG. 7. The air flows down stream from the opening 225 beneath the plates 201 because the adjacent rolls 208 hold the web 18 against the plate 201 so that the D-F web 18 is lifted substantially as shown in FIG. 7. Since the width of the ducts 222 is always less than the narrowest web that can be produced, the openings 225 are sealed by a suitable seal 227 on both sides of the ducts 222 as shown in FIG. 8 to prevent the loss of air pressure except the edges of D-F web 18.

It can also be seen from FIG. 7 that the rolls 208 shown against the belt 206 would be included in a heating zone being used in the mode 1 or mode 2 sequence of operation shown in FIG. 6 and the rolls shown above the belt would be in an inactive zone.

When the machine is stopped, the web 18 must be lifted above the hotplates 201 to prevent burning. Conventional belt lifters 212 are automatically raised in the space 225 between the hotplates by, for example, motorized jackscrews (not shown) which are actuated by an electric signal when the machine is stopped to lift the web 18 and belt 206 above the hotplates 201. When the machine is restarted, the lifters 212 are automatically lowered.

Figure 2:
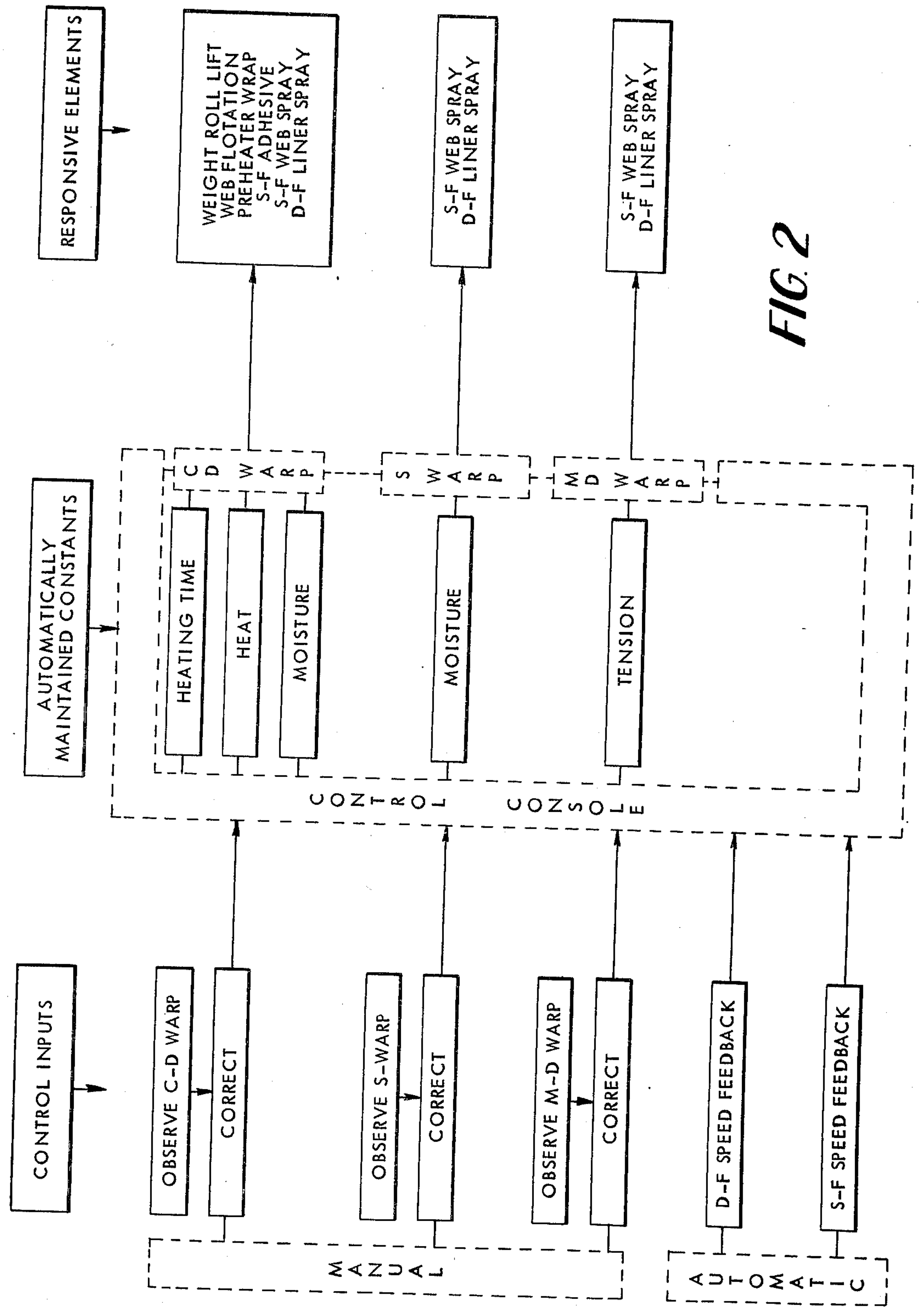
FIG. 2 is a block diagram illustrating the method of the invention and machine elements responsive to operation of the method.

The foregoing has described the methods, construction and operation of the present invention and no further description of its operation is believed necessary. However, in summary, the system provides methods and apparatus for controlling the overall quality and reducing warp in blanks produced by a corrugator. In essence, this is accomplished by providing manual and automatic inputs to a control system for changing and maintaining within the process, such constants being automatically effected by responsive machine elements within the machine as diagrammatically illustrated in FIG. 2.

More specifically, the operator observes the quality and warp conditions of the blanks being produced and in response to such observations, provides a manual input into the control system contained in console 800 to change the relative values of constants such as heating time, heat, moisture, and tension. The result of such inputs is that certain machine elements respond to change such constants. Automatic inputs to console 800 corresponding to the speed of the machine, hence the speed of the webs, maintains the selected values of the constants automatically at selected speeds of operation without further operator attention. The responsive machine elements automatically respond to the automatic inputs of the control console.

It should be understood that it is possible to provide only the portion of the controls necessary to control heating of the D-F web or to control the amount of heat or moisture or tension applied to the S-F web and D-F liner as a function of machine speed to reduce the warp in the blanks, such warp also being a measure of the quality of the blanks. In addition, all of the controls need not be located in one control console; however, a single control station is preferred as is the use of all portions of the controls in combination as set forth above.

Having thus described the invention in its best embodiment and mode of operation, that which is desired to be claimed by Letters Patent is:

1. A method of improving the quality of blanks being made from a double-face corrugated paperboard web issuing from a corrugator machine comprising the steps of:

automatically maintaining substantially constant the heating time of succeeding portions of said double-face web advancing through said corrugator machine to apply a substantially constant amount of heat to said succeeding portions of said double-face web;

automatically maintaining substantially constant the amount of heat applied to succeeding portions of a single-face web forming a first lamina of said double-face web;

automatically maintaining substantially constant the amount of heat applied to succeeding portions of a double-face liner forming a second lamina of said double-face web;

automatically maintaining substantially constant the amount of moisture applied to succeeding portions of said single-face web; and automatically maintaining substantially constant the amount of moisture applied to succeeding portions of said double-face liner throughout the range of operating speeds of said corrugator machine.

2. The method of claim 1 wherein the step of automatically maintaining the heating time of said double-face web substantially constant comprises the steps of:

advancing said succeeding portions of said double-face web in contact with a heated surface in said corrugator machine for a predetermined time interval;

advancing said succeeding portions of said double-face web out of contact with said heated surface following elapse of said time interval;

applying air under pressure beneath said succeeding portions of said double-face web out of contact with said heated surface; and automatically changing the effective heating length of said heated surface in response to changes in the speed of said double-face web to maintain said predetermined time interval substantially constant.

3. The method of claim 2 and the additional steps of:
applying pressure of a first magnitude to the top of said succeeding portions of said double-face web advancing in contact with said heated surface; and
removing said pressure from the top of said succeeding portions of said double-face web advancing out of contact with said heated surface.

4. The method of claim 3 wherein applying pressure of a first magnitude comprises the step of:
applying the full weight of a plurality of ballast rollers to the top of said succeeding portions of said double-face web advancing in contact with said heated surface.

5. The method of claim 2 and the additional steps of:
applying pressure of a second magnitude to the top of said succeeding portions of said double-face web advancing in contact with said heated surface; and
removing said pressure from the top of said succeeding portions of said double-face web advancing out of contact with said heated surface.

6. The method of claim 5 wherein applying pressure of a second magnitude comprises the step of:
applying substantially one-half the weight of a plurality of ballast rollers to the top of said succeeding portions of said double-face web advancing in contact with said heated surface.

7. The method of claim 2 wherein the step of advancing said succeeding portions of said double-face web out of contact with said heated surface comprises the step of:
lifting said succeeding portions of said advancing double-face web above said heated surface.

8. The method of claim 7 wherein lifting said succeeding portions of said advancing double-face web above said heated surface comprises the steps of:
raising a plurality of ballast rollers applying pressure to said double-face web to above said web; and
applying air pressure to beneath said double-face web to lift said succeeding portions of said double-face web above said heated surface.

9. The method of claim 8 wherein applying air pressure to beneath said double-face web comprises the step of:
directing said air pressure to selected locations along the length of said heated surface to beneath said double-face web.

10. The method of claim 2 wherein automatically maintaining said heating time substantially constant comprises the step of:
increasing the effective length of said heated surface in selected proportions to an increase in the speed of said corrugating machine.

11. The method of claim 10 wherein increasing the effective length of said heated surface comprises the step of:
advancing said double-face web in contact with an increasing number of portions of said heated surface, the number of said portions in contact with said double-face web increasing in selected proportions to an increase in the speed of said double-face web.

12. The method of claim 11 and the additional steps of:
applying pressure to the top of said double-face web advancing in contact with said increasing number of portions of said heated surface; and
applying air pressure to the bottom of said double-face web advancing out of contact with succeeding portions of said heated surface.

13. The method of claim 1 wherein the step of automatically maintaining the amount of heat applied to said single-face web and said double-face liner substantially constant comprises the steps of:
increasing the wrap of said single-face web around a first preheater means by a predetermined amount corresponding to an increase in the speed of said double-face web; and
increasing the wrap of said double-face liner around a second preheater means by a predetermined amount corresponding to said increase in the speed of said double-face web.

14. The method of claim 13 wherein the step of automatically maintaining the amount of heat applied to single-face web includes the additional step of increasing the wrap of a single-face liner, forming a portion of said single-face web, around a third preheater means by a predetermined amount corresponding to said increase in the speed of said double-face web.

15. The method of claim 1 wherein the step of automatically maintaining the amount of moisture applied to said single-face web and to said double-face liner substantially constant comprises the steps of:
increasing the amount of water sprayed onto a single-face liner portion of said single-face web by a predetermined amount corresponding to an increase in the speed of said double-face web; and
increasing the water sprayed onto said double-face liner by a predetermined amount corresponding to said increase in the speed of said double-face web.

16. The method of claim 15 and the additional step of:
increasing the amount of adhesive applied to a corrugated medium web forming a part of said single-face web.

17. The method of claim 1 and the additional step of:
automatically maintaining substantially constant the amount of tension applied to said single-face web and said double-face liner independent of the speed of said double-face web.

18. A method of reducing warp in blanks being made from a double-face corrugated paperboard web issuing from a corrugator machine comprising the steps of:
observing the kind and amount of warp in said blanks and, in response to observing warp in said blanks, selectively changing at least one of:
a. the heating time of said double-face web advancing through said corrugator machine;
b. the relative amount of heat between a single-face web and a double-face liner forming said double-face web; and
c. the relative amount of moisture between said single-face web and said double-face liner
to reduce said warp; and, following said selective changing,
automatically maintaining substantially constant said heat time of said double-face webs and the relative amount of heat and moisture in said single-face web and said double-face liner at selected running speeds of said corrugator machine.

19. The method of claim 18 wherein said selective changing is made in response to observing warp in a cross machine direction in said blanks and selectively changing said heating time comprises the steps of:

advancing said double-face web over a heated surface under pressure from above said double-face web for a predetermined time interval; and, thereafter automatically changing the effective heating length of said heated surface in response to changes in the speed of said double-face web.

20. The method of claim 19 wherein advancing said double-face web under pressure comprises the step of selectively applying one of:

pressure of a first magnitude to the top of said double-face web advancing over said heated surface; and pressure of a second magnitude less than said first magnitude to the top of said double-face web advancing over said heated surface.

21. The method of claim 19 including the additional step of:

lifting said advancing double-face web above said heated surface following expiration of said time interval.

22. The method of claim 21 wherein lifting said advancing web comprises the steps of:

removing said pressure above said double-face web; and applying air pressure beneath said double-face web to lift it above said heated surface.

23. The method of claim 19 wherein changing the effective heating length of said heated surface comprises the steps of:

advancing said double-face web over a plurality of portions of said heated surface; and increasing the number of said portions over which said double-face web advances in selected proportions to an increase in the speed of said double-face web.

24. The method of claim 18 wherein said selective changing is made in response to observing warp in a cross machine direction in said blanks and selectively changing the amount of relative heat comprises the step of selectively increasing the amount of heat applied to one of said single-face web and said double-face liner by a preselected amount.

25. The method of claim 24 wherein increasing the amount of heat comprises one of the steps of:

increasing the amount of wrap of said single-face web around a first preheater means; and increasing the amount of wrap of said double-face liner around a second preheater means.

26. The method of claim 18 wherein said selective changing is made in response to observing warp in a cross machine direction in said blanks and selectively changing the relative amount of moisture comprises the step of selectively increasing the amount of moisture applied to one of said single-face web and said double-face liner by a preselected amount.

27. The method of claim 26 wherein increasing the amount of moisture comprises one of the steps of:

increasing the amount of water sprayed across the width of said single-face web; and increasing the amount of water sprayed across the width of said double-face liner.

28. The method of claim 27 and the additional step of:

increasing the amount of adhesive applied to a corrugated medium web forming a part of said single-face web.

29. The method of claim 25 wherein increasing the amount of moisture comprises one of the steps of:

decreasing the amount of heat applied to said single-face web; and decreasing the amount of heat applied to said double-face liner.

30. The method of claim 18 wherein said selective changing is made in response to observing S-warp in a cross machine direction in said blanks and selectively changing the amount of relative moisture comprises the step of selectively increasing the amount of moisture applied to a portion of the width of one of said single-face web and said double-face liner by a preselected amount.

31. The method of claim 30 wherein increasing the amount of moisture comprises one of the steps of:

increasing the amount of water sprayed on said portion of said single-face web; and increasing the amount of water sprayed on said portion of said double-face liner.

32. The method of claim 18 and the additional step of selectively changing the amount of relative tension between said single-face web and said double-face liner independently of said selected running speeds of said corrugator machine.

33. The method of claim 32 wherein said selective changing is made in response to observing warp in a machine direction in said blanks and selectively changing the amount of relative tension comprises the step of selectively increasing the amount of tension applied to one of said single-face web and said double-face liner by a preselected amount.

34. The method of claim 33 wherein increasing the amount of tension comprises one of the steps of:

increasing the amount of tension applied by a tensioning means to said single-face web; and increasing the amount of tension applied by a roll-stand brake means to said double-facer liner.

35. The method of claim 18 wherein the step of maintaining substantially constant said heating time of said double-face web and the amount of relative heat and moisture in said single-face web and said double-face liner comprises the steps of:

sensing the speed of said corrugator machine; and, in response to said sensing, automatically increasing the heating time of said double-face web and the amount of heat and moisture in said double-face web by a preselected amount corresponding to an increase in the speed of said corrugating machine.

36. Apparatus for improving the quality of blanks made from a double-face corrugated paperboard web issuing from a corrugator machine, said machine including in combination:

first heating means for heating said double-face web for a substantially constant time;

second heating means for applying a substantially constant amount of heat to a single-face web and to a double-face liner forming said double-face web;

moisture means for applying a substantially constant amount of moisture to said single-face web and said double-face liner; and control means responsive to the speed of said corrugator machine for controlling said first heating means, said second heating means, and said moisture means to automatically maintain said heating time, said amount of heat, and said amount of moisture substantially constant throughout the range of operating speeds of said corrugator machine.

37. The apparatus of claim 36 wherein said first heating means includes:

a heated surface in said corrugator machine over which said double-face web is advanced;

first pressure means for pressing said double-face web against said heated surface for a distance corresponding to the speed of said corrugator machine to heat said double-face web for a preselected heating time; and second pressure means for lifting said double-face web above said heated surface after said web has been heated for said preselected heating time.

38. The apparatus of claim 37 wherein;

said heating surface includes a plurality of serially aligned heated plates forming a planar heated surface over which said double-face web is movable;

said first pressure means includes:

an endless belt having a lower flight for pressing said double-face web against said planar heated surface; and support means for applying the full height of selected ones of a plurality of weight rolls against said lower flight and for lifting said selected ones above said lower flight; and said second pressure means includes air supply means for directing pressurized air beneath said double-face web at selected locations between said heated plates when selected ones of said weight rolls are lifted above said lower flight.

39. The apparatus of claim 38 wherein said support means includes air pressure means for applying substantially one-half the full weight of selected ones of said weight rolls against said lower flight to reduce the pressure pressing said double-face web against said planar heated surface.

40. The apparatus of claim 39 wherein said control means includes:

manually operable selector means operatively connected to said first and second pressure means for selectively increasing and decreasing said constant heating time of said double-face web at a selected running speed of said corrugator machine to reduce cross machine direction warp in said blanks.

41. The apparatus of claim 40 wherein said first and second pressure means respond to selected positions of said selector means to press said double-face web against a preselected number of said heated plates at a selected running speed of said corrugator machine and to lift said double-face web above remaining ones of said heated plates.

42. The apparatus of claim 36 wherein said second heating means includes at least one first preheater means for said single-face web and at least one second preheater means for said double-face liner, each of said preheater means having:

a heated roll means for heating a web advancing in contact with a circumferential portion of the surface of said roll means;

a guide roll means adjacent said heated roll defining one end of said circumferential portion; and a wrap roll means adjacent said heated roll defining an opposite end of said circumferential portion, said circumferential portion between said one end and said opposite end applying said substantially contant amount of heat to said web.

43. The apparatus of claim 42 wherein said control means includes:

manually operable selector means operatively connected to said first and second preheater means for selectively increasing and decreasing the length of one of said circumferential portions on said heated roll means to selectively increase and decrease said constant amount of heat applied to one of said single-face web and said double-face liner at a selected running speed of said corrugator machine to reduce cross machine direction warp in said blanks.

44. The apparatus of claim 43 wherein said first and second preheater means each include positioning means responsive to selected positions of said selector means for moving said wrap roll means around the circumference of said heated roll means to change the effective heating length of said circumferential portions.

45. The apparatus of claim 36 wherein said mositure means includes a first water spray means for said single-face web and a second water spray means for said double-face liner, each of said water spray means having:

a plurality of selectively operable spray nozzle means for spraying water across the width of a web advancing adjacent to said nozzle means to apply said substantially constant amount of moisture to said web.

46. The apparatus of claim 45 wherein said first and second water spray means each include:

a first array of spray nozzles for spraying water at a first volumetric rate;

a second array of spray nozzles for spraying water at a second volumetric rate;

a third array of spray nozzles for spraying water at a third volumetric rate; and selectively operable valve means for each of said arrays for controlling the flow of water thereto.

47. The apparatus of claim 46 wherein said control means includes:

manually operable selector means operatively connected to said valve means for selectively controlling operation of said valve means to selectively increase and decrease said constant amount of moisture applied to one of said single-face web and said double-face liner at a selected running speed of said corrugator machine to reduce cross machine direction warp in said blanks.

48. The apparatus of claim 47 further including:

selectively adjustable metering means for controlling the amount of adhesive applied to a corrugated medium web, forming a part of said single-face web, during a first range of running speeds of said corrugator machine, said metering means being automatically responsive to selected positions of said selector means for applying additional adhesive to said medium web during a second range of running speeds of said corrugator machine for applying additional moisture to said medium web to reduce cross machine direction warp in said blanks.

49. The appparatus of claim 47 wherein;

said first array applies water to said web at a first volumetric rate;

said second array applies water to said web at a second volumetric rate greater than said first volumetric rate;

said third array applies water to said web at a third volumetric rate greater than said second volumetric rate; and the valve means associated with said arrays respond to selected positions of said selector means to apply water to said web at a rate corresponding to said selected positions.

50. The apparatus of claim 49 wherein:

at least one of said arrays is divided across the width of said web for applying water to substantially one-half the width of said web in response to a selected position of said selector means to reduce S-warp in said blanks.

51. The apparatus of claim 49 wherein:

said valve means' automatically respond to an increase in the speed of said corrugator machine to increase the volume of water applied to said web by a predetermined amount to maintain the amount of moisture applied to said web substantially constant at selected running speeds of said corrugator machine.

52. The apparatus of claim 36 and in addition:

tension means for applying a substantially constant amount of tension to said single-face web and said double-face liner independent of the running speed of said corrugator machine.

53. The apparatus of claim 52 wherein said tension means includes:

bridge means supporting a first tension means for applying selectable amounts of tension to said single-face web; and roll stand means including a second tension means for applying selectable amounts of tension to said double-face web.

54. The apparatus of claim 53 wherein said control means includes:

manually operable selector means operatively connected to said first and second tension means for selectively increasing and decreasing the amount of tension applied to one of said single-face web and said double-face liner to reduce machine direction warp in said blanks.

* * * * *